(12) United States Patent
Washiro

(10) Patent No.: US 8,023,890 B2
(45) Date of Patent: Sep. 20, 2011

(54) COMMUNICATION SYSTEM, COMMUNICATION APPARATUS, AND ELECTRIC-FIELD-COUPLING ANTENNA

(75) Inventor: Takanori Washiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 1071 days.

(21) Appl. No.: 11/838,544

(22) Filed: Aug. 14, 2007

(65) Prior Publication Data

US 2008/0076351 A1 Mar. 27, 2008

(30) Foreign Application Priority Data

Sep. 11, 2006 (JP) ................................. 2006-245614
Jun. 6, 2007 (JP) ................................. 2007-150500

(51) Int. Cl.
*H04B 5/00* (2006.01)

(52) U.S. Cl. ....... 455/41.1; 343/745; 343/750; 343/790; 343/791; 343/850; 343/853; 343/857; 343/858; 343/860

(58) Field of Classification Search .............. 455/41.1; 343/745, 747, 750, 790–792, 850, 853, 857, 343/858, 860

See application file for complete search history.

(56) References Cited

U.S. PATENT DOCUMENTS

| | | | | |
|---|---|---|---|---|
| 4,301,456 A | * | 11/1981 | Lovick, Jr. | .................. 343/708 |
| 5,099,227 A | | 3/1992 | Geiszler et al. | |
| 5,557,290 A | * | 9/1996 | Watanabe | ..................... 343/713 |
| 6,147,659 A | | 11/2000 | Takahashi et al. | |
| 6,396,392 B1 | | 5/2002 | Abraham | |
| 6,677,763 B2 | * | 1/2004 | Geisel | ........................ 324/640 |
| 7,151,497 B2 | * | 12/2006 | Crystal | ........................ 343/747 |
| 2004/0266332 A1 | | 12/2004 | Lang | |

FOREIGN PATENT DOCUMENTS

| | | |
|---|---|---|
| CN | 1567739 A | 1/2005 |
| CN | 1720672 A | 1/2006 |
| JP | 05-53312 | 7/1993 |
| JP | 06-260815 | 9/1994 |
| JP | 09-018393 | 1/1997 |
| JP | 11-088039 | 3/1999 |
| JP | 2000-134028 | 5/2000 |
| JP | 2001-060823 | 3/2001 |
| JP | 2002-064309 | 2/2002 |
| JP | 2002-253955 | 9/2002 |

(Continued)

OTHER PUBLICATIONS

Search and Examination Report for Singapore Patent Application No. 200705963-7 dated Jul. 2, 2008, 9 pages.

(Continued)

*Primary Examiner* — Tuan A Tran
(74) *Attorney, Agent, or Firm* — Finnegan, Henderson, Farabow, Garrett & Dunner, L.L.P.

(57) ABSTRACT

A communication system includes the following elements: a transmitter including a transmission circuit unit configured to generate an RF signal for transmitting data and an EFC antenna configured to transmit the RF signal as an electrostatic field or an induced electric field; a receiver including an EFC antenna and a reception circuit unit configured to receive and process the RF signal received by the EFC antenna; and an impedance snatching unit configured to make an impedance of the EFC antenna of the transmitter equal to an impedance of the EFC antenna of the receiver. The RF signal is transmitted by electric-field coupling between the EFC antennas, facing each other, of the transmitter and the receiver.

25 Claims, 17 Drawing Sheets

FOREIGN PATENT DOCUMENTS

| | | |
|---|---|---|
| JP | 2003-163644 | 6/2003 |
| JP | 2004-214879 | 7/2004 |
| JP | 2004-361276 | 12/2004 |
| JP | 2005-18671 | 1/2005 |
| JP | 2005-051584 | 2/2005 |
| JP | 2005-203879 | 7/2005 |
| JP | 2005-217962 | 8/2005 |
| JP | 2006-60283 | 3/2006 |
| JP | 2006-106612 | 4/2006 |
| JP | 2007-054474 | 3/2007 |
| WO | WO 00/44064 | 7/2000 |

OTHER PUBLICATIONS

Teshirogi Tasuku et al., "Modern Millimeter-Wave Technologies", Ohmsha p. 119.

Toshimi Meiri, "Study of Surface-Waves Propagated through Two Ferrite Rods in Parallel", Shizuoka University.

Yasuto Mushiake, "Antenna Denpa Denpan (Antenna/Radio-Wave Propagation)", Corona Publishing Co., Ltd., 1985, pp. 16-18.

Masamitsu Nakajima, "Microwave Engineering", Morikita Publishing Company, pp. 182-190.

* cited by examiner

NO WAVE IS REFLECTED IN THE CASE OF MATCHED IMPEDANCES

CHARACTERISTICS OF
SINGLE EFC ANTENNA

CHARACTERISTIC
IMPEDANCE $Z_0$

CHARACTERISTIC
IMPEDANCE $Z_1$

CHARACTERISTICS OF
SINGLE EFC ANTENNA

CHARACTERISTIC
IMPEDANCE $Z_0$

CHARACTERISTIC
IMPEDANCE $Z_0$

COMMUNICATION SYSTEM, COMMUNICATION APPARATUS, AND ELECTRIC-FIELD-COUPLING ANTENNA

CROSS REFERENCES TO RELATED APPLICATIONS

The present, invention contains subject matter related to Japanese Patent Application JP 2006-245614 filed in the Japanese Patent Office on Sep. 11, 2006, and Japanese Patent Application JP 2007-150500 filed in the Japanese Patent Office on Jun. 6, 2007, the entire contents of which are incorporated herein by reference.

BACKGROUND OF THE INVENTION

1. Field of the Invention

The present invention relates to communication systems for communicating a large amount of data between information devices, and more particularly to a communication system for performing high-capacity data communication between information devices using an ultra-wideband (UWB) communication scheme using a radio-frequency (RF), wideband signal.

More specifically, the present invention relates to a communication system, a communication apparatus, and an electric-field-coupling antenna (hereinafter called "EFC antenna") for transmitting a UWB communication signal between information devices disposed at a very short distance using an electrostatic field (quasi-electrostatic field) or an induced electric: field, and more particularly to a communication system, a communication apparatus, and an EFC antenna for enabling high-capacity transmission by efficiently transmitting an RF signal between EFC antennas of information devices using an electrostatic field or an induced electric field over a very short distance.

2. Description of the Related Art

Recently, the use of wireless interfaces in transferring data between small information devices, such as when image data or music data is exchanged between a small information device and a personal computer (PC), is becoming more widespread in place of data transmission using a general cable, such as an audio/visual (AV) cable or a universal serial bus (USB) cable, to interconnect the information devices or using a medium such as a memory card. Wireless interfaces are user-friendlier because they do not involve the reconnection of connectors and the wiring of a cable every time data transmission is performed. Various information devices having cableless communication functions are now available.

As methods of cableless data transmission between small devices, besides wireless local area networks (LANs) represented by the Institute of Electrical and Electronics Engineers (IEEE) 802.11 and Bluetooth®, radio communication schemes of performing transmission/reception of radio signals using antennas have been developed. For example, a proposal has been made for a portable image recording apparatus containing an internal antenna placed at a position not covered with a hand holding a grip (for example, see Japanese Unexamined Patent Application Publication No. 2006-106612). Since the internal antenna is not covered with the hand, correct image data is received. Even in the case where the antenna for wireless communication is placed inside the apparatus, the antenna can exert its characteristics.

A communication scheme referred to as "ultra-wideband" (UWB), which has been drawing increasing attention in recent years, is a wireless communication technology for implementing high-capacity wireless data transmission at approximately 100 Mbs, though over a short distance, using a very wide frequency band from 3.1 GHz to 10.6 GHz, Therefore, a large amount of data, such as a moving image or music data contained in one compact disc (CD), can be transferred at high speed in a short period of time.

The UWB communication has a communication distance of approximately 10 m due to its relationship with transmission power. Using UWB, a short-distance wireless communication scheme, such as a personal area network (PAN), may be configured. For example, in IEEE 802.15.3 or the like, the scheme of transmitting data having a packet structure including a preamble is designed as an access control scheme in the UWB communication. Intel Corporation in the United States is studying, as a UWB application, a wireless version of USB, which has been widely used as a general interface for PCs.

UWB transmission systems using a UWB low-band from 3.1 GHz to 4.9 GHz have been actively developed taking into consideration that the UWB communication can transfer data at a rate exceeding 100 Mbps without occupying a transmission band from 3.1 GHz to 10.6 GHz, and the simplicity of fabricating an RF circuit. The inventor of the present invention believes that a data transmission system employing a UWB low-band is one of effective wireless communication techniques to be applied to mobile devices. For example, high-speed data transmission in a short-distance area, such as an ultra-high-speed, short-distance device area network (DAN) including a storage device, can be implemented.

In the case where the strength of an electric field (the strength of radio waves) at a distance of 3 m from a wireless facility is less than or equal to a predetermined level, that is, in the case where very weak radio waves merely causing noise for other wireless systems existing in the neighborhood are emitted, the licensing of a radio station is unnecessary (for example, see the Regulations for the Enforcement of the Radio Law, Article 6(1-1) (Regulation No. 14, Radio Regulatory Committee, 1950)). Therefore, the development and production cost of a wireless system can be reduced. Due to its relationship with transmission power, the above-described UWB communication can implement a short-distance wireless communication system at a relatively low electric-field level. However, in the case of a UWB communication system using a radio communication scheme for performing transmission and reception of radio signals using antennas, an electric field generated therein is difficult to be suppressed to a very weak level.

Many known wireless communication systems employ radio communication schemes and allow signals to propagate using a radiated electric field generated in the case where current flows through an aerial (antenna). In this case, a transmitter side emits radio waves regardless of the presence of a communication partner. This may generate jamming waves which disturb the neighboring communication systems. An antenna at a receiver side receives not only desired waves from the transmitter, but also radio waves arriving from far away. Thus, the antenna at the receiver side is susceptible to the influence of ambient jamming waves, resulting in a reduction of the reception sensitivity. In the case where a plurality of communication partners exists, a complicated setting is necessary to be done in order to select a desired communication partner from the plurality of communication partners. For example, in the case where a plurality of pairs of wireless devices perform wireless communication within a narrow range, division multiplexing such as frequency selection is necessary to be done in order to perform communication that does not interfere with other pairs of wireless devices. Since a radio wave perpendicular to the direction of polarization is not communicated, the directions of polarization of the antennas of the transmitter and the receiver are necessary to be aligned.

For example, in the case of a contact less data communication system in which communication is performed within a very short distance from a few millimeters to a few centimeters, it is preferable that the transmitter and the receiver be coupled strongly within a short distance, but a signal not reach across a long distance in order to avoid interference with other systems. It is also preferable that data communication devices be coupled with each other regardless of the orientations (directions) thereof in the case where the data communication devices are placed in close proximity with each other, that is, it is preferable that the devices have no directivity. In order to perform high-capacity data communication, it is preferable that the devices can perform broadband communication.

In wireless communication, besides the above-mentioned radio communication using a radiated electric field, various communication schemes using an electrostatic field or an induced electric field are available. For example, an electric-field coupling scheme or an electromagnetic-induction scheme is employed in existing contactless communication systems mainly used in radio frequency identification (RFID). An electrostatic field or an induced electric field is inversely proportional to the cube or the square of the distance from the source thereof. Therefore, very weak radio waves in which the strength of an electric field (strength of radio waves) is less than or equal to a predetermined level at a distance of 3 m from a wireless facility can be emitted, and hence the licensing of a radio station is unnecessary. In this type of contactless communication system, a transmission signal is rapidly attenuated according to the distance. In the case where no nearby communication partner exists, no coupling relationship occurs, and hence other communication systems are not disturbed. Even in the case where radio waves arrive from far away, an EFC antenna receives no radio waves, and hence the present system is not interfered with by other communication systems. That is, contactless, very-short-distance communication using electric field coupling employing an induced electric field or an electrostatic field is suitable for emitting very weak radio waves.

Contactless, very-short-distance communication systems have some advantages over general wireless communication systems. For example, in the case where a radio signal is exchanged between devices located at a relatively long distance, the quality of the radio signal in a radio range is deteriorated due to a neighboring reflector or an increase in the communication distance. In contrast, short-distance communication is not dependent on its surrounding environment and can transfer a high-quality signal with a low error rate at a high transfer rate. In a very-short-distance communication system, there is no chance for an unauthorized device to intercept transmission data. Therefore, it is unnecessary to take into consideration prevention of hacking on a transmission line and securing of confidentiality.

In radio communication, it is necessary for an antenna to have a size of approximately one-half or one-fourth of its operating wavelength $\lambda$, which leads to an increase in the size of an apparatus. In contrast, there are no such limitations in a very-short-distance communication system using an induced electromagnetic field or an electrostatic magnetic field.

For example, a proposal for an RFID tag system has been made (for example, see Japanese Unexamined Patent Application Publication No. 2006-60283). In this system, pairs of communication auxiliary units are arranged so that RFID tags are positioned between a plurality of communication auxiliary units. By arranging RFID tags attached to a plurality of merchandise items so as to be sandwiched between the communication auxiliary units, stable reading and writing of information can be implemented even in the case where RFID tags overlap one another.

A proposal for a data communication apparatus using an induced magnetic field has been made (for example, see Japanese Unexamined Patent Application Publication No. 2004-214879). The apparatus includes a main body, a mounting tool configured to mount the main body to a physical body of a user, an antenna coil, and a data communication unit configured to perform contactless data communication with an external communication apparatus via the antenna coil. The antenna coil and the data communication unit are placed on an outer casing provided above the main body of the apparatus.

A proposal has been made for a cellular phone, which is en exemplary portable information device, provided with an RFID, which ensures a communication distance without sacrificing the portability (for example, see Japanese Unexamined Patent Application Publication No. 2005-18671). A memory card to be inserted into the portable information device includes an antenna coil configured to perform data communication with an external device. An RFID antenna coil is provided in the exterior of a memory-card insertion slot of the portable information device.

Because known RFID systems employing an electrostatic field or an induced electric field use lower-frequency signals, the systems communicate at a low speed and are thus not suitable for high-capacity data transmission. In the case of communication scheme using an electromagnetic field induced by an antenna coil, no communication can be performed in the case where a metal plate is positioned behind the coil. A large planar area is necessary for mounting the coil. Such mounting problems are found in this type of communication scheme. Further, a transmission line has a large loss, and hence the signal transmission efficiency is poor.

In contrast, the inventor of the present invention believes that high-speed data transmission taking into consideration confidentiality can be implemented by emitting a very weak electric field which does not call for the licensing of a wireless station in a very-short-distance communication system for transmitting an RF signal using electric-field coupling, that is, transmitting the above-mentioned UWB communication signal by employing an electrostatic field or an induced electromagnetic field. The inventor of the present invention believes that, in the UWB communication system using an electrostatic field or an induced electric field, a large amount of data, such as a moving image or music data contained in one CD, can be transferred at high speed in a short period of time.

In known RFID systems, electrodes (EFC antennas) of a transmitter and a receiver are generally attached to each other, which is inconvenient for a user. It is thus desirable to perform short-distance communication in which, the electrodes are separated by a distance of approximately 3 cm.

In an electric-field coupling scheme using signals in a relatively low frequency band, the 3-cm distance between the electrodes of the transmitter and the receiver is negligible relative to the wavelength, and the propagation loss between the transmitter and the receiver is not a serious problem. However, when transmitting a higher-frequency, wideband signal such as a UWB signal, a distance of 3 cm corresponds to approximately one-half of the wavelength of an operating frequency of 4 GHz. Since the propagation loss occurs in accordance with the propagation distance relative to the wavelength, the distance between the electrodes of the transmitter and the receiver is considerably long relative to the wavelength. Therefore, the propagation loss should be sufficiently suppressed in the case where a UWB signal is transmitted using electric-field coupling.

SUMMARY OF THE INVENTION

It is desirable to provide an excellent communication system that can perform high-capacity data communication between information devices using a UWB communication scheme employing an RF wideband signal.

It is also desirable to provide an excellent communication system, communication apparatus, and EFC antenna that can transmit a UWB communication signal between information devices placed at a very short distance by using an electrostatic field (quasi-electrostatic field) or an induced electric field.

It is also desirable to provide an excellent communication system, communication apparatus, and EFC antenna that can perform high-capacity transmission by efficiently transmitting an RF signal between EFC antennas of information devices using an electrostatic field or an induced electric field over a very short distance.

According to an embodiment of the present invention, there is provided a communication system including the following elements: a transmitter including a transmission circuit unit configured to generate an RF signal for transmitting data and an EFC antenna configured to transmit the RF signal as an electrostatic field or an induced electric field; a receiver including an EFC antenna and a reception circuit unit configured to receive and process the RF signal received by the EFC antenna; and an impedance matching unit configured to make an impedance of the EFC antenna of the transmitter equal to an impedance of the EFC antenna of the receiver. The RF signal is transmitted by electric-field coupling between the EFC antennas, facing each other, of the transmitter and the receiver.

The "system" mentioned here refers to a logical assembly of a plurality of devices (or function modules that realize specific functions) and does not make any distinction between whether or not the devices or the function modules are contained in a single casing (the same applies hereinafter).

User-friendliness is improved in the case where data transfer between small information devices, such as when data including images or music is exchanged between a small information device and a PC, is implemented in a cableless manner. However, many wireless communication systems represented by wireless LANs use a radiated electric field generated by allowing current to flow through an antenna. Therefore, radio waves are emitted regardless of the presence of a communication partner. Since the radiated electric field is attenuated gradually in inverse proportion to the distance from the antenna, a signal reaches relatively far. This may generate jamming waves which disturb the neighboring communication systems. Due to the surrounding jamming waves, the sensitivity of an antenna at a receiver side is reduced. In short, it is difficult to implement wireless communication using a radio communication scheme in which a communication partner is limited to that located at a very short distance.

In contrast, in a communication system using an electrostatic field or an induced electric field, no coupling relationship occurs in the case where no nearby communication partner exists. The strength of an induced electric field or an electrostatic field is rapidly attenuated in inverse proportion to the square or the cube of the distance from the source thereof. That is, no unnecessary electric fields are generated, and electric fields do not reach far, whereby other communication systems are not disturbed. Even in the case where radio waves arrive from far away, the coupling electrode receives no radio waves, and hence the system is not interfered with by other communication systems. However, this type of known communication system has low communication speed because of using a lower-frequency signal, and is thus unsuitable for high-capacity data transmission. In the case of a communication scheme using an induced electromagnetic field, a large planar area is necessary for mounting a coil. Such mounting problems are found in this type of communication scheme.

In contrast, the communication system according to the embodiment of the present invention is configured to transmit a UWB signal between the transmitter configured to generate a UWB signal for transmitting data and the receiver configured to receive and process the UWB signal by establishing electric-field coupling between the EFC antennas of the transmitter and the receiver. Since an electrostatic field and an induced electric field are attenuated in inverse proportion to the cube and the square, respectively, of the distance, very weak radio waves which do not call for the licensing of a wireless station can be emitted. It is also unnecessary to take into consideration prevention of hacking on a transmission line and securing of confidentiality. Because the communication system performs the UWB communication, high-capacity communication over a very short distance can be implemented. For example, a large amount of data, such as a moving image or music data contained in one CD, can be transferred at high speed in a short period of time.

Since an RF circuit incurs propagation loss in accordance with the propagation distance relative to the wavelength, it is necessary to sufficiently suppress the propagation loss in the case where an RF signal, such as a UWB signal, is transmitted.

In the communication system according to the embodiment of the present invention, in the transmitter, an RF-signal transmission line for transmitting the RF signal generated by the transmission circuit unit may be connected substantially to the center of an electrode of the EFC antenna via the impedance matching unit and a resonating section. In the receiver, an RF-signal transmission line for transmitting the RF signal to the reception circuit unit may be connected substantially to the center of an electrode of the EFC antenna via the impedance matching unit and a resonating section. The impedance matching units make the impedance of the EFC antenna of the transmitter equal to the impedance of the EFC antenna of the receiver, thereby suppressing reflected waves between the EFC antennas and reducing the propagation loss.

Each impedance matching unit and each resonating section are configured to achieve impedance matching between the electrodes of the transmitter and the receiver, that is, in a coupling portion, and to suppress reflected waves. The impedance matching unit and the resonating section may serve as a band-pass filter with a desired RF band as a passband between the EFC antennas of the transmitter and the receiver. More specifically, the impedance matching unit may include a lumped-constant circuit. Alternatively, the impedance matching unit may include a conductor with a length dependent on an operating wavelength. In the latter case, a conductive pattern with a length dependent on an operating frequency (may also be referred to as a "stub") is formed on a printed circuit board on which the EFC antenna is mounted, thus operating as an impedance matching unit.

The EFC antenna may achieve impedance matching by reducing, relative to a characteristic impedance at an input side to which the RF signal is input from the transmission circuit unit, a characteristic impedance at an output side establishing electric-field coupling to a communication partner. That is, a larger amount of current is allowed to flow through the coupling electrodes. In this case, the EFC antennas induce a stronger electric field, thereby allowing the electrodes to be strongly coupled with each other.

More specifically, the EFC antenna includes an electrode, a series inductor, and a parallel inductor, all of which are connected to an RF-signal transmission line. The RF-signal transmission line mentioned here corresponds to a coaxial cable, a microstrip line, a coplanar line, or the like. If it is only necessary to achieve impedance matching and to suppress reflected waves between the electrodes of the transmitter and the receiver, that is, in the coupling portion, it is sufficient for the EFC antennas to have a simple structure in which the electrode and the series inductor are connected to the RF-signal transmission line. In contrast, in the case where the EFC antenna is connected to ground in front of the electrode at the tip of the RF-signal transmission line with the parallel inductor interposed therebetween, the EFC antenna alone functions as an impedance conversion circuit configured to reduce the characteristic impedance $Z_1$ at the output side of the EFC antenna relative to the characteristic impedance $Z_0$ at the input side of the EFC antenna. Accordingly, a larger amount of current flows through the electrodes, thereby inducing a stronger electric field and allowing the electrodes to be strongly coupled. The series inductor and the parallel inductor may be included in a lumped-constant circuit or a distributed-constant circuit including a conductor with a length dependent on the operating wavelength.

The electrode included in the EFC antenna may be mounted above a printed circuit board on which, for example, a communication processing circuit is mounted. The height, from the printed circuit board to the electrode is determined according to the following conditions: the electric-field coupling to ground on the printed circuit board is suppressed; a series inductor necessary for achieving the above-mentioned impedance matching is formed; and the emission of unnecessary radio waves due to current flowing in the series inductor is suppressed (that is, the operation of a resonating section including the series inductor as an antenna is not so strong).

In radio communication, it is not allowed to place metal such as ground near a radiant element, of an antenna. In contrast, in communication using electric-field coupling, the characteristics of the EFC antenna are not deteriorated even in the case where metal is placed facing the backside of the electrode of the EFC antenna. The EFC antenna can be made more compact than a known antenna by appropriately selecting the constants of the series inductor and the parallel inductor. Unlike an antenna, an electrostatic magnetic field has no polarization. A predetermined level of communication quality can thus be achieved even with a different orientation.

In the communication system according to the embodiment of the present invention, communication can be performed in the case where the EFC antennas of the transmitter and the receiver face each other, and a capacitance is generated between the two electrodes. Unlike a radiated electric field, an electrostatic magnetic field has no polarization. Therefore, the shape of each electrode is not limited to a plate shape and can be freely designed in accordance with the design of a wireless device. For example, in the case of a hemispherical electrode, an optimal electric-field coupling line can be realized without depending on the relative positional relationship between the electrodes facing each other.

According to the embodiments of the present invention, there is provided an excellent communication system that can perform high-capacity data communication between information devices using a UWB communication scheme employing an RF wideband signal.

According to the embodiments of the present invention, there is provided an excellent communication system, communication apparatus, and EFC antenna that can transmit a UWB communication signal between information devices placed at a very short distance by using an electrostatic field (quasi-electrostatic field) or an induced electric field.

According to the embodiments of the present invention, there is provided an excellent communication system, communication apparatus, and EFC antenna that can perform high-capacity transmission by efficiently transmitting an RF signal between EFC antennas of information devices using an electrostatic field or an induced electric field over a very short distance.

According to the embodiment or the present invention, there is provided a very-short-distance communication system that can perform high-speed data transmission in which a UWB signal is transmitted using electric-field coupling between EFC antennas of a transmitter and a receiver. By bringing desired communication devices physically closer to each other, a communication partner is intuitively selected without complicated setting, and a communication operation starts.

In the communication system according to the embodiment of the present invention, no radio waves are emitted in the absence of a communication partner nearby since no coupling relationship occurs, and hence the communication system does not interfere with other communication systems. Even in the case where radio waves arrive from far away, the EFC antenna receives no radio waves, and hence the communication system is not interfered with by other communication systems.

The communication system according to the embodiment of the present invention is a very-short-distance communication system using electric-field coupling. In other words, the communication system has difficulty in performing communication over a long distance. Therefore, the communication system can reduce the risk of being hacked by an unexpected device.

In each of the EFC antennas used in the transmitter and the receiver, the backside of the electrode can be metal ground. Communication is not affected by the presence of metal behind the EFC antenna. An electric field generated from the electrode has no adverse effects on a circuit behind the EFC antenna.

In the case of transmission of a UWB signal using an electric-field coupling scheme, as in the embodiments of the present invention, there is no polarization, unlike radio communication using antennas. A uniform level of communication quality can thus be achieved regardless of the orientation of each EFC antenna. The shape of each electrode can be freely designed, and the EFC antenna can be made more compact than a known antenna.

Further features and advantages of the present invention will become apparent from the following description of exemplary embodiments with reference to the attached, drawings.

DESCRIPTION OF THE PREFERRED EMBODIMENTS

Figure 1:
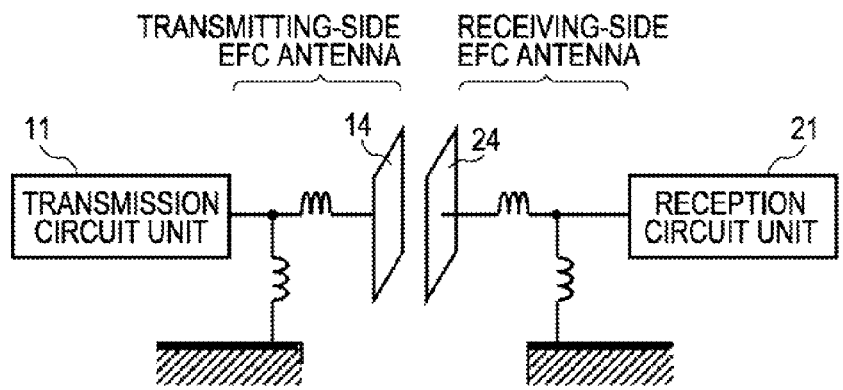
FIG. 1 is a diagram of an exemplary configuration of a communication system according to an embodiment of the present invention.

Preferred embodiments of the present invention will now herein be described in detail below with reference to the drawings.

The present invention relates to a communication system for performing data transmission between information devices using an electrostatic field or an induced electric field.

According to a communication scheme based on an electrostatic field or an induced electric field, no radio waves are emitted in the absence of communication partners nearby since no coupling relationship occurs, and hence other communication systems are not disturbed. Even in the case where radio waves arrive from far away, an EFC antenna receives no radio waves, and hence the communication system is not interfered with by other communication systems.

In known radio communication using antennas, the strength of a radiated electric field is inversely proportional to the distance. In contrast, the strength of an induced electric field is attenuated in inverse proportion to the square of the distance, and the strength of an electrostatic field, is attenuated in inverse proportion to the cube of the distance. According to a communication scheme based on the electric-field coupling, very weak radio waves merely causing noise for other wireless systems existing in the neighborhood can be emitted, and hence the licensing of a radio station becomes unnecessary.

Although an electrostatic field changing with time may be referred to as a "quasi-electrostatic field", this is also included in an "electrostatic field" in this specification.

Since known communication employing an electrostatic field or an induced electric field uses lower-frequency signals, the known communication is unsuitable for transferring a large amount of data. In contrast, a communication system according to an embodiment of the present invention transfers higher-frequency signals using the electric-field coupling, and hence the communication system can transfer a large amount of data. More specifically, as in ultra-wideband (UWB) communication, a communication scheme using high frequencies over a wideband is applied to the electric-field coupling, thereby implementing high-capacity data communication using very weak radio waves.

The UWB communication uses a very wide frequency band from 3.1 GHz to 10.6 GHz and implements, though over a short distance, wireless transmission or a large amount of data at a rate of approximately 100 Mbps. The UWB communication is a communication technology originally developed as a radio communication scheme using antennas. For example, in IEEE 802.15.3 or the like, the scheme of transmitting data having a packet structure including a preamble is designed as an access control scheme in the UWB communication, Intel Corporation in the United States is studying, as a UWB application, a wireless version of USB, which has been widely used as a general interface for PCs.

UWB transmission systems using a UWB low-band from 3.1 GHz to 4.9 GHz have been actively developed taking into consideration that the UWB communication can transfer data at a rate exceeding 100 Mbps without occupying a transmission band from 3.1 GHz to 10.6 GHz, and the simplicity of fabricating an RE circuit. The inventor of the present invention believes that a data transmission system employing a UWB low-band is one of effective wireless communication techniques to be applied to mobile devices. For example, high-speed data transmission in a short-distance area, such as an ultra-high-speed, short-distance device area network (DAN) including a storage device, can be implemented.

The inventor of the present invention believes that, according to a UWB communication system employing an electrostatic field or an induced electric field, data communication using a very weak electric field can be implemented. The inventor also believes that, according to such a UWB communication system, a large amount of data, such as a moving image or music data contained in one CD, can be transferred at high speed in a short period of time.

FIG. 1 shows an exemplary configuration of a contactless communication system using an electrostatic field or an induced electric field. The communication system illustrated in the drawing includes a transmitter 10 configured to perform data transmission and a receiver 20 configured to perform data reception. As illustrated in FIG. 1, in the case where EFC antennas of the transmitter and the receiver are disposed facing each other, two electrodes operate as a capacitor, and the EFC antennas as a whole operate as a band-pass filter, thereby efficiently transmitting an RF signal between the two EFC antennas, A transmission electrode 14 of the transmitter 10 and a reception electrode 24 of the receiver 20 are arranged facing each other with a gap of, for example, 3 cm, and hence can produce electric-field coupling. In response to a transmission request issued from an upper application, a transmission circuit unit 11 of the transmitter 10 generates an RF transmission signal, such as a UWB signal, on the basis of transmission data, and the signal propagates from the transmission electrode 14 to the reception electrode 24. A reception circuit unit 21 of the receiver 20 demodulates and decodes the RF signal received to reproduce data and transfers the reproduced, data to the upper application.

According to a communication scheme using high frequencies over a wideband as in the UWB communication, ultra-high speed data transmission at a rate of approximately 100 Mbps can be implemented over a short distance. In the case where the UMB communication is performed using electric-field coupling instead of performing radio communication, the strength of the electric field is in inverse proportion to the cube or the square of the distance. By controlling the strength of the electric field (strength of radio waves) over a distance of 3 m from a wireless facility to be less than or equal to a predetermined level, very weak radio waves can be emitted, and hence the licensing of a radio station becomes unnecessary. Therefore, an inexpensive communication system, can be implemented. In the case of very-short-distance data communication using an electric-field coupling scheme, the quality of a signal is not deteriorated due to a neighboring reflector. Further, it is also unnecessary to take into consideration prevention of hacking on a transmission line and securing of confidentiality.

In contrast, the propagation loss increases with the propagation distance relative to the wavelength. In order to allow an RF signal to propagate using electric-field coupling, the propagation loss is necessary to be reduced to a sufficiently small value. In the communication scheme of transmitting an RF wideband signal, such, as a UWB signal, using electric-field coupling, communication over a very short distance of approximately 3 cm corresponds to approximately one-half of the wavelength of an operating frequency of 4 GHz. Thus, such a very short distance should not be neglected. Particularly, the characteristic impedance causes a more serious problem in a higher-frequency circuit than in a lower-frequency circuit. An impedance mismatch at a coupling point between electrodes of a transmitter and a receiver has a more striking effect in a higher-frequency circuit.

Figure 12:
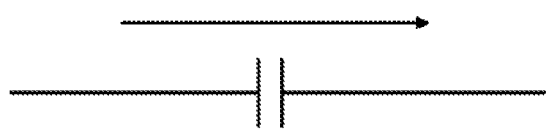
FIG. 12 illustrates an exemplary structure in which, in communication using frequencies of kHz or MHz, a transmitter and a receiver each have an EFC antenna including only an electrode, and a coupling portion simply operates as a plane parallel capacitor.
Figure 13:
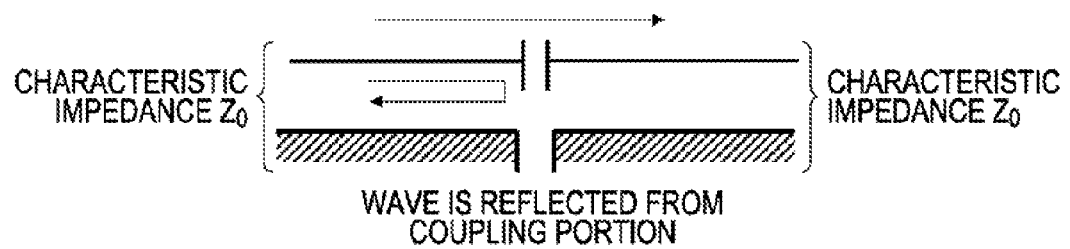
FIG. 13 illustrates a propagation loss caused by signal reflection from an impedance mismatch portion in a coupling portion in the case of communication using higher frequencies of GHz.

Since the propagation loss in space is small in the case of communication using frequencies of kHz or MHz, as illustrated in FIG. 12, desired data transmission can be performed, even in the case where a transmitter and a receiver each have an EFC antenna including only an electrode and a coupling portion simply operates as a plane parallel capacitor. In contrast, communication using higher frequencies of GHz has a large propagation loss in space. It is thus necessary to suppress signal reflection and to improve transmission efficiency. As illustrated in FIG. 13, in the case where an RF-signal transmission line of a transmitter and an RF-signal transmission line of a receiver are adjusted to a predetermined characteristic impedance $Z_0$, no impedance matching can be achieved in a coupling portion by simply coupling the two transmission lines using a plane parallel capacitor. Therefore, a signal is reflected from an impedance mismatch portion in the coupling portion, thereby causing a propagation loss and reducing the efficiency.

For example, in the UWB communication system using an electrostatic magnetic field, which is illustrated in FIG. 1, even in the case where an RF-signal transmission line connecting the transmission circuit unit 11 to the transmission electrode 14 is a coaxial line with a matched impedance of, for example, 50Ω, in the case of an impedance mismatch in a coupling portion between the transmission electrode 14 and the reception electrode 24, a signal is reflected to incur propagation loss.

Figure 2:
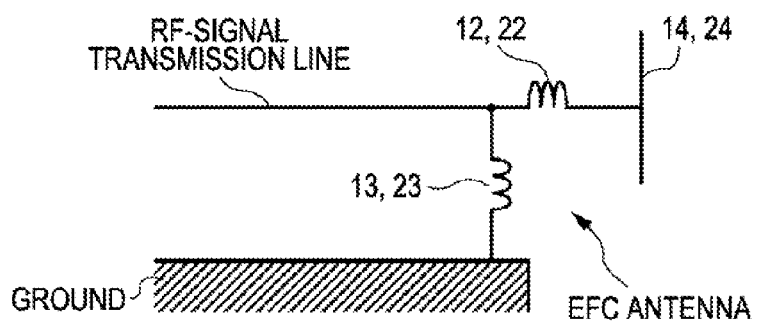
FIG. 2 is a diagram, of an exemplary structure of an EFC antenna placed in each of a transmitter and a receiver.
Figure 3:
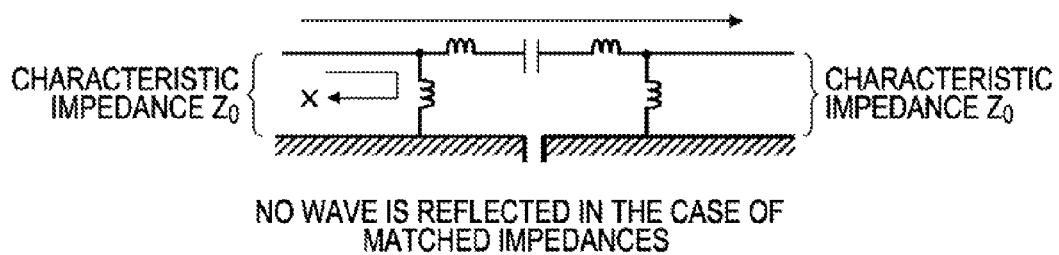
FIG. 3 is a diagram of the structure in which electrodes of the EFC antennas illustrated in FIG. 2 are disposed facing each other.

In the embodiment, EFC antennas provided in the transmitter 10 and in the receiver 20 include, as illustrated in FIG. 2, the electrodes 14 and 24 in a plate shape, series inductors 12 and 22, and parallel inductors 13 and 23, which are connected to the RF-signal transmission line. In the case where the above-mentioned EFC antennas are arranged facing each other, as illustrated in FIG. 3, the two electrodes operate as a capacitor, and the EFC antennas as a whole operate as a band-pass filter. Therefore, an RF signal can be transmitted efficiently between the two EFC antennas. The RF-signal transmission line mentioned here corresponds to a coaxial cable, a microstrip line, a coplanar line, or the like.

Figure 4A:
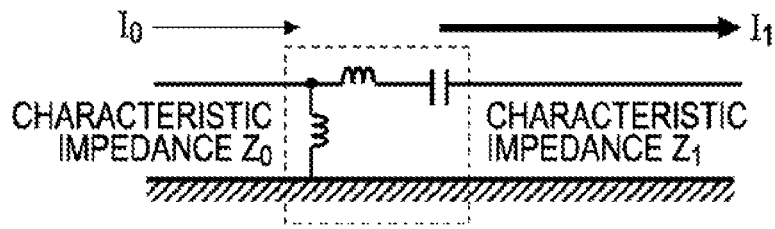
FIG. 4A illustrates characteristics of the single EFC antenna illustrated in FIG. 2.
Figure 4B:
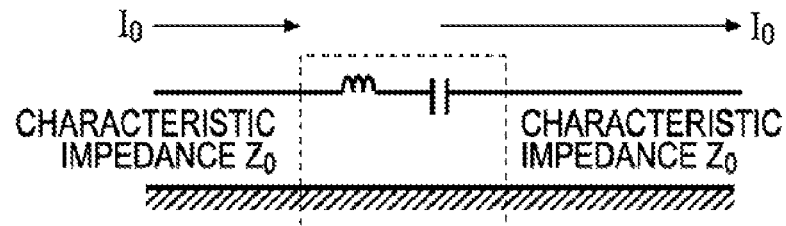
FIG. 4B illustrates characteristics of the single EFC antenna illustrated in FIG. 2.

If it is only necessary to achieve impedance matching and to suppress reflected waves between the electrodes of the transmitter 10 and the receiver 20, that is, in the coupling portion, it is not necessary for, as illustrated in FIG. 4A, the EFC antennas to include the plate-shaped electrodes 14 and 24, the series inductors 12 and 22, and the parallel inductors 13 and 23, which are connected to the RF-signal transmission line. Rather, as illustrated in FIG. 4B, it is sufficient for the EFC antennas to have a simple structure in which the plate-shaped electrodes 14 and 24 and the series inductors are connected to the RF-signal transmission line. That is, by simply disposing the series inductors on the RF-signal transmission line in the case where the EFC antenna of the transmitter faces the EFC antenna of the receiver at a very short distance, the impedance in the coupling portion can be designed to be continuous.

Note that, in an exemplary structure illustrated in FIG. 4B, there is no change in the characteristic impedance before and after the coupling portion, and hence the amount of current does not change either. In contrast, as illustrated in FIG. 4A, in the case where the EFC antenna is connected to ground via the parallel inductance interposed between the input side of the electrode at the tip of the RF-signal transmission line and ground, the EFC antenna, alone functions as an impedance conversion circuit configured to reduce the characteristic impedance $Z_1$ at the output side of the EFC antenna relative to the characteristic impedance $Z_0$ at the input, side of the EFC antenna (that is, $Z_0 > Z_1$). Therefore, the output current $I_1$ of the EFC antenna can be amplified compared with the input current $I_0$ input to the EFC antenna (that is, $I_0 < I_1$).

Figure 5A:
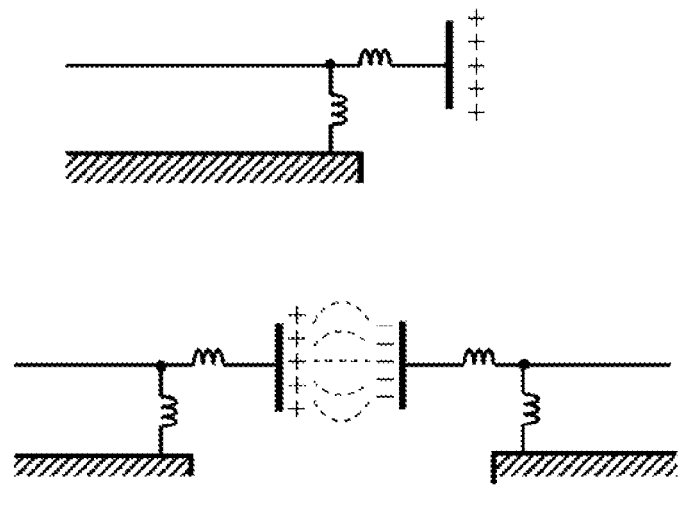
FIG. 5A illustrates the induction of an electric field by the EFC antenna with the function as an impedance converter.
Figure 5B:
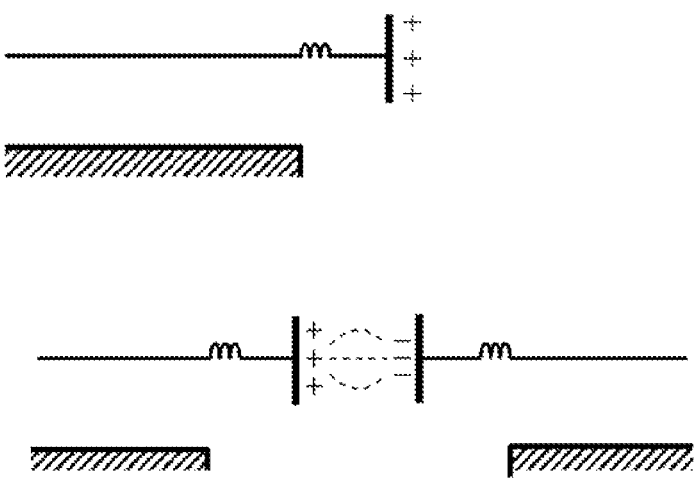
FIG. 5B illustrates the induction of an electric field by the EFC antenna with the function as an impedance converter.

FIGS. 5A and 5B illustrate the induction of an electric field by the electric-field coupling between the electrodes of the EFC antennas with and without parallel inductances. As is clear from the drawings, a stronger electric field can be induced by providing parallel inductors in addition to series inductors in the EFC antennas, thereby allowing the electrodes to be strongly coupled to each other. In the case where a strong electric field is induced near the electrodes as illustrated in FIG. 5A, the generated electric field propagates in the front direction of the electrode surface as a longitudinal wave causing vibration along the direction of travel. Due to this electric-field wave, a signal can be transmitted between the electrodes even when the electrodes are separated at a relatively large distance.

In a communication system for transmitting an RF signal, such as a UWB signal, using electric-field coupling, the necessary conditions of the EFC antennas are as follows:
(1) the presence of electrodes for establishing electric-field coupling;
(2) the presence of parallel inductors for establishing stronger electric-field coupling; and
(3) the setting of the constants of the inductors and the constant of a capacitor including the electrodes such that the impedance matching can be achieved in a frequency band used for communication in the case where the EFC antennas are placed facing each other.

Figure 6:
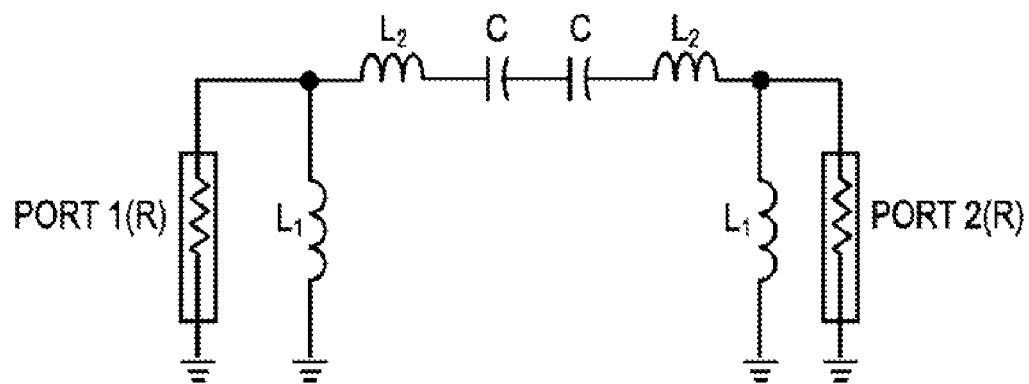
FIG. 6 is an equivalent circuit diagram of a band-pass filter including a pair of EFC antennas.

The passband frequency $f_0$ of a band-pass filter including a pair of EFC antennas having electrodes facing each other, as illustrated in FIG. 3, can be determined on the basis of the inductances of the series inductors and the parallel inductors and the capacitance of the capacitor including the electrodes. FIG. 6 is an equivalent circuit diagram of a band-pass filter including a pair of EFC antennas. Given the characteristic impedance R [Ω], the center frequency $f_0$ [Hz], and the phase difference α [radian] ($\pi < \alpha < 2\pi$) between an input signal and a pass signal, and the capacitance C/2 of the capacitor including the electrodes, the constants of the parallel inductance $L_1$ and the series inductance $L_2$ included in the band-pass filter can be calculated in accordance with the operating frequency $f_0$ using the following equations:

$$L_1 = -\frac{R(1+\cos\alpha)}{2\pi f_0 \sin\alpha}[H] \quad (1)$$

$$L_2 = \frac{1+\pi f_0 CR\sin\alpha}{4\pi^2 f_0^2 C}[H]$$

Figure 7:
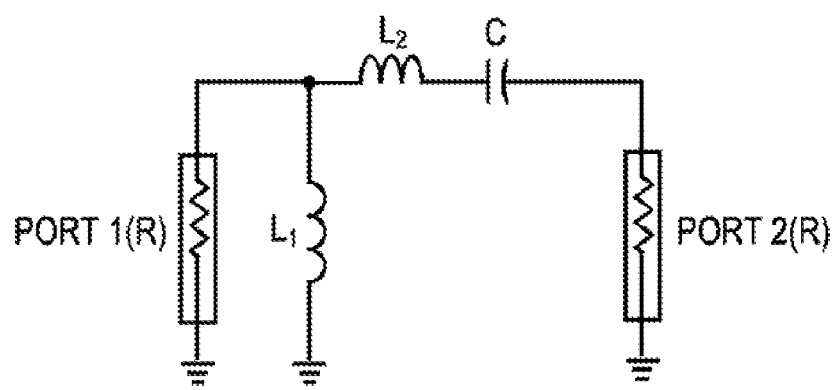
FIG. 7 is an equivalent circuit diagram of an impedance conversion circuit including a single EFC antenna.

In the case where a single EFC antenna functions as an impedance conversion circuit, an equivalent circuit thereof is illustrated in FIG. 7. In the circuit diagram illustrated in FIG. 7, the parallel inductance $L_1$ and the series inductance $L_2$ are selected in accordance with the operating frequency $f_0$ so as to satisfy the following equations and expression, thereby implementing an impedance conversion circuit configured to convert the characteristic impedance from $R_1$ to $R_2$:

$$L_1 = \frac{R_1}{2\pi f_0}\sqrt{\frac{R_2}{R_1 - R_2}}[H] \quad (2)$$

$$L_2 = \frac{1}{4\pi^2 f_0^2}\left(\frac{1}{C} - 2\pi f_0\sqrt{R_2(R_1-R_2)}\right)[H]$$

$$R_1 > R_2$$

As has been described above, in the contactless communication system illustrated in FIG. 1, communication devices that perform the UWB communication use the EFC antennas illustrated in FIG. 2 instead of antennas used in wireless communication devices employing a known radio communication scheme. Therefore, very-short-distance data, transmission with features that have not been achieved before can be implemented.

As illustrated in FIG. 3, two EFC antennas whose electrodes face each other at a very short distance operate as a band-pass filter for allowing passage of signals in a desired frequency band, and a single EFC antenna operates as an impedance conversion circuit configured to amplify current. In contrast, in the case where the single EFC antenna is placed in free space, the input impedance of the EFC antenna does not match the characteristic impedance of the RF-signal transmission line. As a result, a signal input from the RF-signal transmission line is reflected in the EFC antenna and is not emitted to the outside.

According to the communication system of the embodiment, unlike an antenna, the transmitter does not continuously emit radio waves in the absence of a communication partner. Only when a communication partner approaches the transmitter and an electrode of the communication partner and the electrode of the transmitter form a capacitor, impedance matching is achieved, as illustrated in FIG. 3, whereby an RF signal is transmitted.

Figure 18:
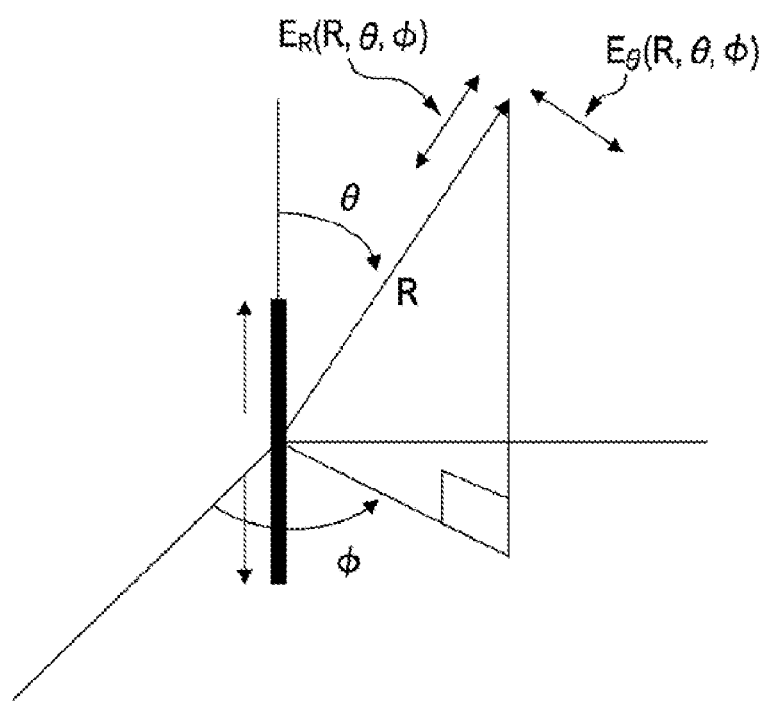
FIG. 18 illustrates an electric field component (longitudinal wave component) $E_R$ causing vibration parallel, to the direction of propagation.
Figure 19:
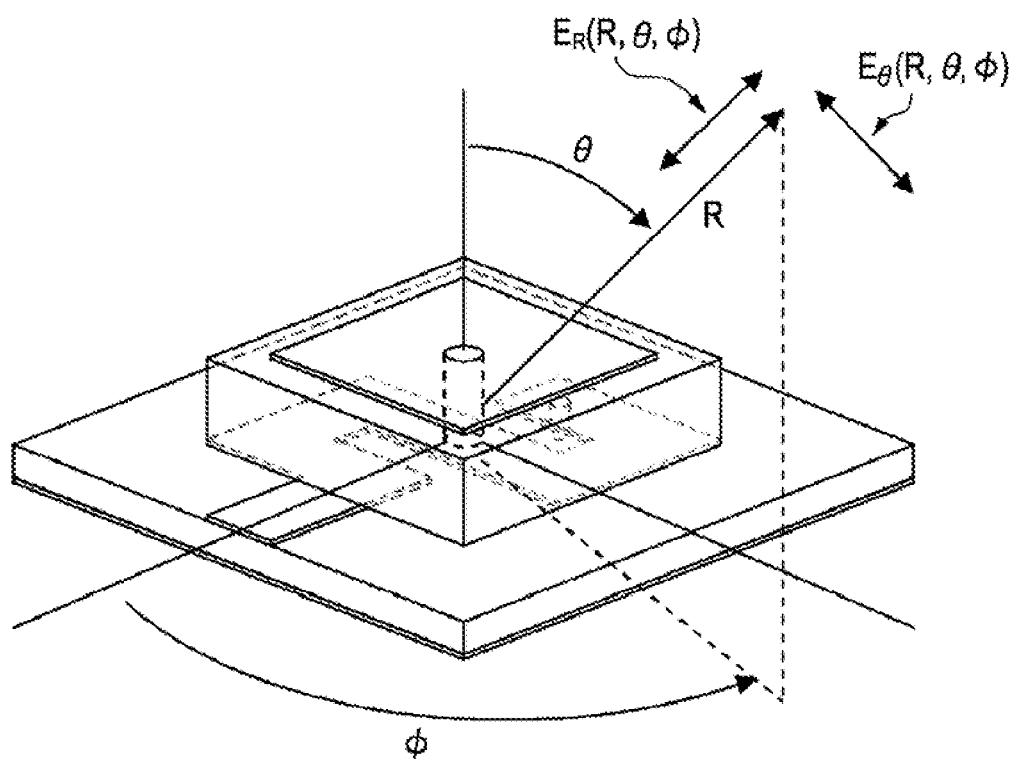
FIG. 19 illustrates the mapping of an electromagnetic field induced by an infinitesimal dipole on a coupling electrode.

An electromagnetic field, generated by a coupling electrode of a transmitter will be examined. FIG. 18 illustrates an electromagnetic field induced by an infinitesimal dipole. FIG. 19 illustrates the mapping of this electromagnetic field on the coupling electrode. As shown in the diagrams, the electromagnetic field is largely classified into an electric field component (transverse wave component) $E_\theta$ causing vibration in a direction perpendicular to the direction of propagation and an electric field component (longitudinal wave component) $E_R$ causing vibration parallel to the direction of propagation. A magnetic field $H_\phi$ is also generated around the infinitesimal dipole. The following equations represent an electromagnetic field induced by an infinitesimal dipole. Any current distribution can be regarded as a continuous assembly of such infinitesimal dipoles. Therefore, electromagnetic fields induced by these infinitesimal dipoles have similar characteristics (for example, see Yasuto Mushiake, "Antenna Denpa Denpan (Antenna/Radio-Wave Propagation)", published by Corona Publishing Co., Ltd., 1985, pp. 16-18).

$$E_\theta = \frac{pe^{-jkR}}{4\pi\varepsilon}\left(\frac{1}{R^3} + \frac{jk}{R^2} - \frac{k^2}{R}\right)\sin\theta \quad (3)$$

$$E_R = \frac{pe^{-jkR}}{2\pi\varepsilon}\left(\frac{1}{R^3} + \frac{jk}{R^2}\right)\cos\theta$$

-continued $$H_\phi = \frac{j\omega\rho e^{-jkR}}{4\pi}\left(\frac{1}{R^2} + \frac{jk}{R}\right)\sin\theta$$

As is clear from the above equations, the electric-field transverse wave component includes a component in inverse proportion to the distance (radiated electric field), a component in inverse proportion to the square of the distance (induced electric field), and a component in inverse proportion to the cube of the distance (electrostatic field). The electric-field longitudinal wave component includes a component in inverse proportion to the square of the distance (induced electric field) and a component in inverse proportion to the cube of the distance (electrostatic field), but does not include a component of the radiated electromagnetic field. The electric field $E_R$ reaches its maximum in directions where |cos θ|=1, that is, in directions indicated by arrows in FIG. 18.

In radio communication widely employed in wireless communication, a radio wave emitted from an antenna is a transverse wave $E_\theta$ causing vibration in a direction perpendicular to its direction of travel. A radio wave perpendicular to the direction of polarization is not communicated. In contrast, an electromagnetic wave emanating from a coupling electrode by employing a communication scheme using an electrostatic field or an induced electric field includes, besides a transverse wave $E_\theta$, a longitudinal wave $E_R$ causing vibration along its direction of travel. The longitudinal wave $E_R$ is also referred to as a "surface wave". By the way, a surface wave can also propagate through the interior and on the surface of a medium, such as a conductor, a dielectric, or a magnetic body.

Of transmission waves using electromagnetic fields, a wave whose phase velocity v is slower than the velocity of light c is referred to as a "slow wave", and a wave whose phase velocity v is faster than the velocity of light c is referred to as a "fast wave". A surface wave corresponds to the former slow wave.

In a contactless communication system, a signal can be transmitted through the intermediary of any of a radiated electric field, an electrostatic field, and an induced electric field. However, a radiated electric field, which is inversely proportional to the distance, may interfere with other systems located relatively far away. It is thus preferable to suppress the radiated electric field component, that is, to perform contactless communication using the longitudinal wave $E_R$ containing no radiated electric, field component while suppressing the transverse wave $E_\theta$ containing the radiated electric field component.

Figure 14A:
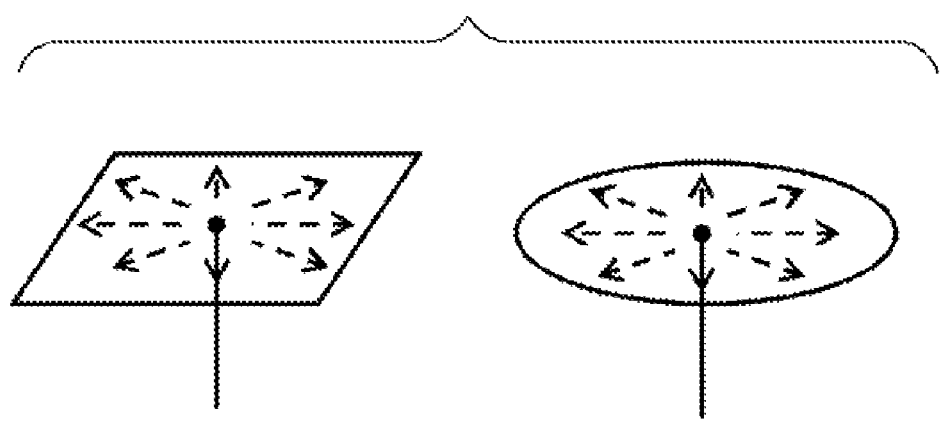
FIG. 14A illustrates the flow of current in an electrode of an EFC antenna in the case where an RF transmission line is connected to the center of the electrode.

From the above-mentioned, viewpoint, the EFC antennas according to the embodiment are devised in the following manner. That is, the above-mentioned three equations representing the electromagnetic field show that, in the case where θ=0° holds true, $E_\theta$=0 holds true, and the $E_R$ component reaches its maximum. More specifically, $E_\theta$ reaches its maximum when it is perpendicular to the direction of current flow, and $E_R$ reaches its maximum when it is parallel to the direction of current flow. In order to maximize $E_R$ in front of the electrode, which is perpendicular to the electrode surface, it is preferable to increase current components perpendicular to the electrode. In contrast, in the case where the feeding point is offset from the center of the electrode, current components parallel to the electrode increase due to this offset. In accordance with the current components, the $E_\theta$ component in front of the electrode increases. Therefore, each of the EFC antennas according to the embodiment provides the feeding point substantially at the center of the electrode (described later), as illustrated in FIG. 14A, such that the $E_R$ component can be maximized.

In known antennas, besides a radiated electric field, an electrostatic field and an induced electric field are also generated. The electric-field coupling occurs in the case where a transmission antenna and a reception antenna are placed near each other. However, since most of the energy is emitted as a radiated electric field, such known antennas are insufficient to perform contactless communication. In contrast, the EFC antennas illustrated in FIG. 2 include the coupling electrodes and resonating sections in order to improve the transmission efficiency by generating a stronger electric field $E_R$ at a predetermined frequency.

In the case where the EFC antenna of the transmitter illustrated in FIG. 2 is used alone, a longitudinal-wave electric field component $E_R$ is generated on the surface of the coupling electrode. Since a transverse-wave component $E_\theta$ containing a radiated electric field is smaller than $E_R$, only negligible radio waves are emitted. That is, waves interfering with other neighboring systems are not generated. Most of the signals input to the EFC antenna are reflected from the electrode back to an input end.

In contrast, in the case where a pair of EFC antennas is used, that is, in the case where EFC antennas of a transmitter and a receiver are placed at a short distance, coupling electrodes are coupled to each other mainly by a quasi-electrostatic field component and operate as a capacitor. As a result, the EFC antennas as a whole operate as a band-pass filter, thus achieving impedance matching. At passband frequencies, signals and power are largely transmitted to a communication partner and are negligibly reflected back to the input end. The "short distance" mentioned here is defined by wavelength λ, that is, corresponds to the distance between the coupling electrodes d being d<<λ/2π. For example, in the case where the operating frequency $f_0$ is 4 GHz, the "short distance" between the electrodes is a distance of 10 mm or less.

In the case where the EFC antennas of the transmitter and the receiver are placed at a medium distance, an electrostatic field is attenuated and a longitudinal-wave electric field $E_R$ mainly containing an induced electric field is generated in the vicinity of the coupling electrode of the transmitter. The longitudinal-wave electric field $E_R$ is received by the coupling electrode of the receiver, whereby a signal is transmitted. Note that, compared with the case where the EFC antennas are placed at a short distance, it is more likely that a signal input to the EFC antenna of the transmitter will be reflected from the electrode back to the input end. The "medium distance" mentioned here is defined by the wavelength λ, that is, corresponds to the distance between the coupling electrodes d being approximately one to a few times λ/2π. In the case where the operating frequency $f_0$ is 4 GHz, the "medium distance" between the electrodes is a distance from 10 mm to 40 mm.

Figure 8:
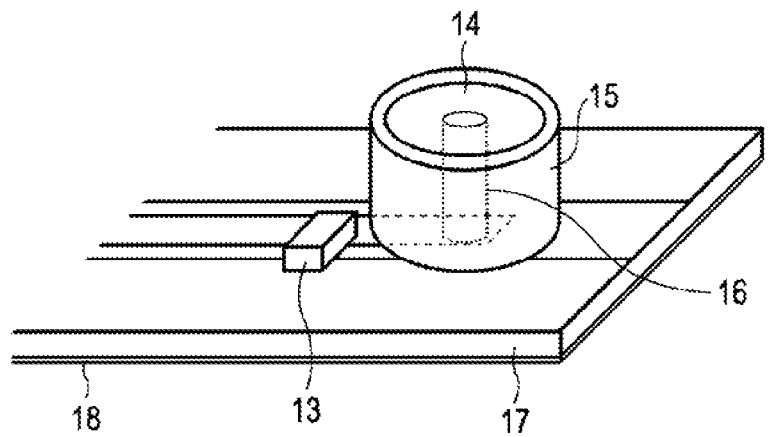
FIG. 8 illustrates an exemplary structure of the actual EFC antenna.

FIG. 5 shows an exemplary structure of the actual EFC antenna illustrated in FIG. 2. In the example shown in FIG. 8, the EFC antenna of the transmitter 10 is illustrated. However, the receiver 20 includes a similar EFC antenna. Referring to FIG. 8, the electrode 14 is disposed on the upper surface of a cylindrical dielectric 15 and is electrically connected to an RF-signal transmission line on a printed circuit board 17 via a through hole 16 penetrating through the dielectric 15.

The EFC antenna illustrated can be fabricated by, for example, forming a through hole in a cylindrical dielectric of a predetermined height, forming a conductive pattern serving as a coupling electrode on the upper end face of the cylinder, filling the through hole with conductor, and mounting the dielectric on a printed circuit board by reflow soldering or the like.

The height from a circuit mounting surface of the printed circuit board 17 to the coupling electrode 14, that is, the length of the through hole 16, is adjusted appropriately in accordance with the operating wavelength to allow the through hole 16 to have an inductance, which can therefore replace the series inductor 12 illustrated in FIG. 2. The RF-signal transmission line is connected to ground 18 via the parallel inductor 13 having a chip shape.

The dielectric 15 and the through hole 16 play the role of avoiding the coupling between the coupling electrode 14 and the ground 18 and the role of forming a series inductor. Having a sufficient height from the circuit mounting surface of the printed circuit board 17 to the electrode 14 to form the series inductor 12, the electric-field coupling between the ground 13 and the electrode 14 is avoided, and the function as the EFC antenna (that is, the electric-field coupling to the EFC antenna at the receiver side) is ensured. Note that, when the height of the dielectric 15 is large, that is, the distance from, the circuit mounting surface of the printed circuit board 17 to the electrode 14 is so long relative to the operating wavelength that the distance is difficult to be ignored, the series inductor 12, i.e., a resonating section, operates as an antenna and adversely emits unnecessary radio waves due to current flowing in the series inductor 12. In this case, the attenuation of radio waves emitted by the resonating section of the EFC antenna behaving as an antenna relative to the distance is smaller than that of an electrostatic field or an induced electric field. It is thus difficult to suppress these radio waves to very weak radio waves where the strength of an electric field at a distance of 3 m from a wireless facility is less than or equal to a predetermined level. Therefore, the height of the dielectric 15 is determined on the basis of the following conditions: the coupling to the ground 18 is avoided while the characteristics as the EFC antenna are fully achieved; a series inductor necessary for operating as an impedance matching circuit is formed; and the emission of unnecessary radio waves due to current flowing in the series inductor is suppressed (that is, the operation of the resonating section including the series inductor as an antenna is not so strong).

In general, metal hinders efficient radiation of radio waves emitted from an antenna. For this reason, it is not allowed to place metal such as ground near a radiant element of an antenna. In contrast, in the communication system according to the embodiment, the characteristics of the EFC antenna are not deteriorated even in the case where metal is placed facing the backside of the electrode 14. The EFC antenna can be made more compact than a known antenna by appropriately selecting the constants of the series inductor 12 and the parallel inductor 13. Unlike an antenna, an electrostatic magnetic field has no polarization. A predetermined level of communication quality can thus be achieved even with a different orientation.

An antenna transmits a signal using a radiated electric field which is attenuated in inverse proportion to the distance. In contrast, the EFC antenna according to the embodiment transmits a signal mainly using an induced electric field which is attenuated in inverse proportion to the square of the distance and an electrostatic field which is attenuated in inverse proportion to the cube of the distance. Particularly in the case of an electrostatic field, the electric coupling rapidly weakens as the distance between the electrodes increases, leading to difficulty in performing communication. This means that this is suitable for communication over a very short distance using a very weak electric field.

Figure 15:
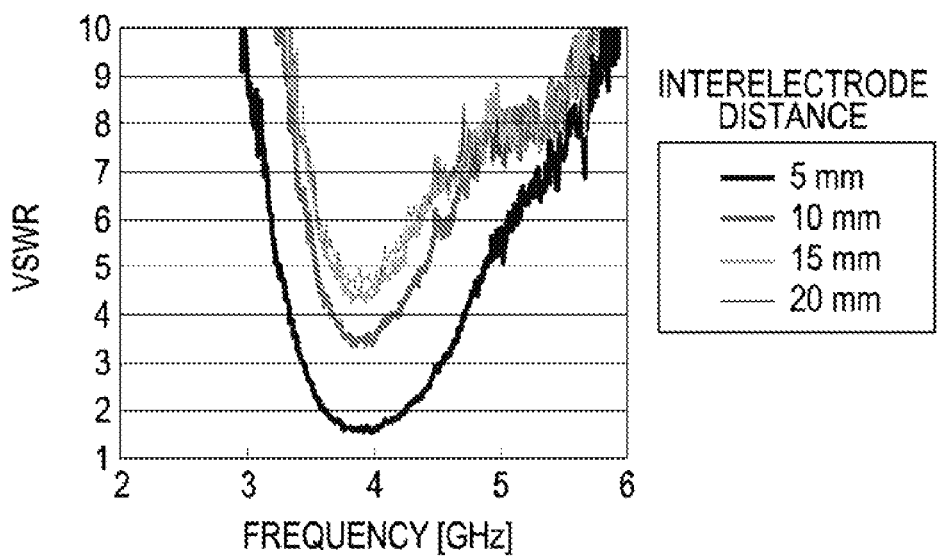
FIG. 15 is a graph of measured values of S parameter (reflection characteristic: voltage standing wave ratio (VSWR)) obtained by disposing two EFC antennas facing each other and changing the distance between coupling electrodes.
Figure 16:
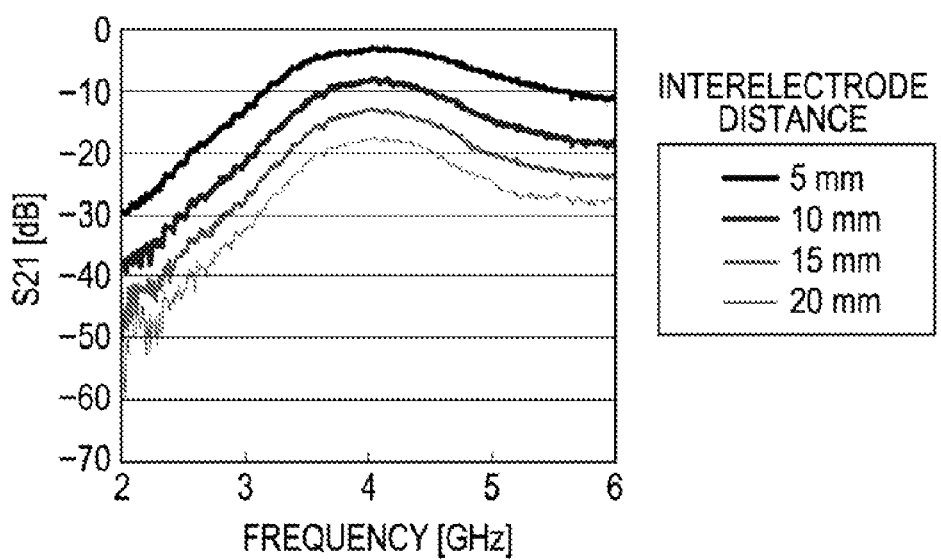
FIG. 16 is a graph of measured values of S parameter (propagation loss $S_{21}$) obtained by disposing two EFC antennas facing each other and changing the distance between coupling electrodes.

FIGS. 15 and 16 illustrate measured values of S parameters obtained by disposing two EFC antennas facing each other and changing the distance between coupling electrodes. The S parameters include a voltage standing wave ratio (VSWR) corresponding to a reflection characteristic $S_{11}$ of a signal which is emitted from a transmitting side and reflected from a receiving side back to the transmitting side; and a propagation loss $S_{21}$ of a signal which is emitted from the transmitting side and which reaches the receiving side. FIG. 15 illustrates the VSWR, and FIG. 16 illustrates the propagation loss $S_{21}$. Note that the size of ground of each EFC antenna is 17 mm×17 mm, the size of each coupling electrode is 8 mm×8 mm, the height of the electrode (length of a metal line) is 4 mm whereby substituting for a series inductor, and the parallel inductance is 1.8 nH.

In general, the VSWR is recommended to be less than or equal to two. It is clear from FIG. 15 that, for EFC antennas operating around 4 GHz, in the case where the distance between the transmitter and the receiver is less than or equal to 10 mm, the VSWR becomes a small value and impedance matching is achieved. In this case, it is regarded that the coupling electrodes of the EFC antennas are coupled to each other through an electrostatic field and operate as a capacitor. In contrast, in the case where the distance between the transmitter and the receiver is greater than 10 mm, the VSWR becomes a relatively large value and impedance matching is not achieved. In this case, it is regarded that the two EFC antennas are coupled and transmit a signal mainly using a longitudinal-wave induced electric field.

Figure 9:
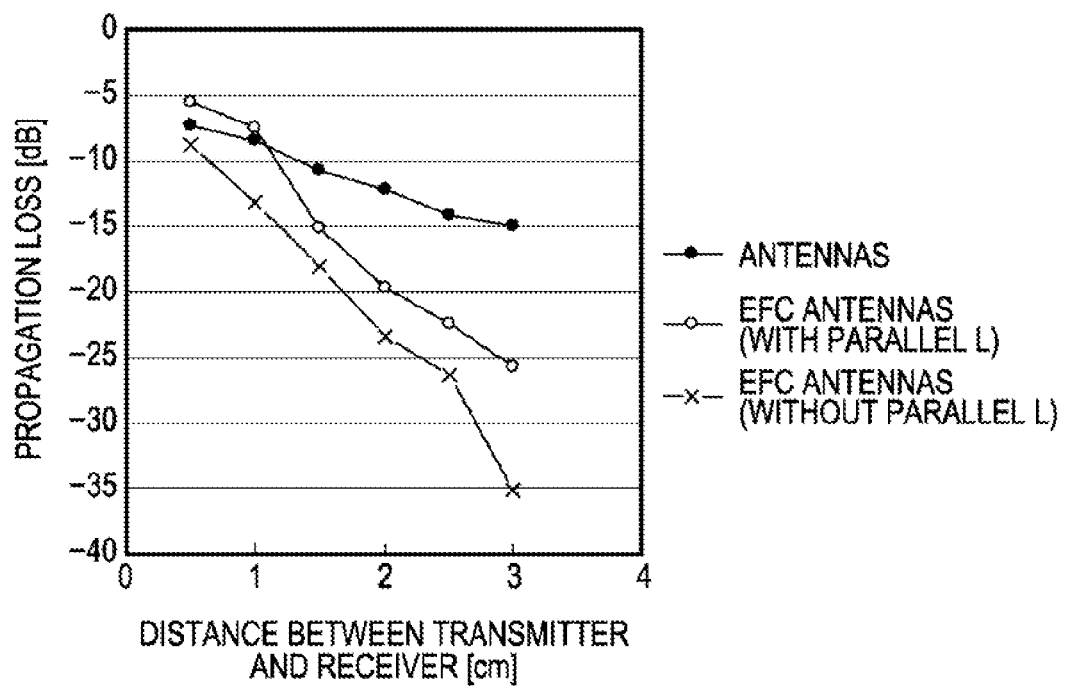
FIG. 9 is a graph of the measurement results of propagation losses obtained by changing the distance between antennas, EFC antennas (with parallel inductors), and EFC antennas (without parallel inductors) which are placed facing each other.

FIG. 9 shows comparison of the measurement results of propagation losses obtained by changing the distance between antennas, EFC antennas (with parallel inductors), and EFC antennas (without parallel inductors) which are placed facing each other.

In the case of antennas, the propagation loss does not become as large as that in the case of the EFC antennas (with parallel inductors) even when the distance increases, and a signal disturbing other wireless systems may possibly be generated. In the case of the EFC antennas without parallel inductors, the propagation efficiency is low, and the propagation loss is large even in the case where a communication partner is nearby.

In contrast, in the case of the EFC antennas (with parallel inductors), the EFC antennas are strongly coupled to each other up to a short distance of approximately 1 cm, and the propagation loss is small. However, the signal is rapidly attenuated as the distance increases, resulting in characteristics that do not interfere with the surrounding neighborhood. By including the parallel inductors in the EFC antennas, impedance matching can be achieved in an operating frequency band in the case where the coupling electrodes of the EFC antennas are arranged facing each other at a very short distance, and the EFC antennas are coupled to each other through a stronger electric field.

The electrodes of the EFC antennas are connected to the RF transmission line, such as a coaxial cable, a microstrip line, or a coplanar line. The "EFC antennas" mentioned in this specification solve problems inherent in RF circuits.

Figure 14B:
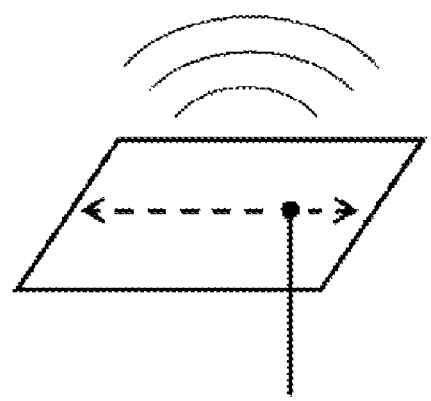
FIG. 14B illustrates the uneven flow of current in an electrode of an EFC antenna and the radiation of unnecessary radio waves in the case where an RF transmission line is connected to a position offset from the center of the electrode.

In each EFC antenna, it is assumed that the RF transmission line (or a series inductor) is connected to the center of the electrode. By connecting the RF transmission line to the center of the electrode, current flows evenly in the electrode, thereby preventing unnecessary radio waves from emanating in front of the electrode in a substantially perpendicular direction relative to the electrode surface (see FIG. 14A). In contrast, by connecting the RF transmission line to a position offset from the center of the electrode, current flows unevenly in the electrode, and the electrode operates as a microstrip antenna and emits unnecessary radio waves (see FIG. 14B).

Figure 17:
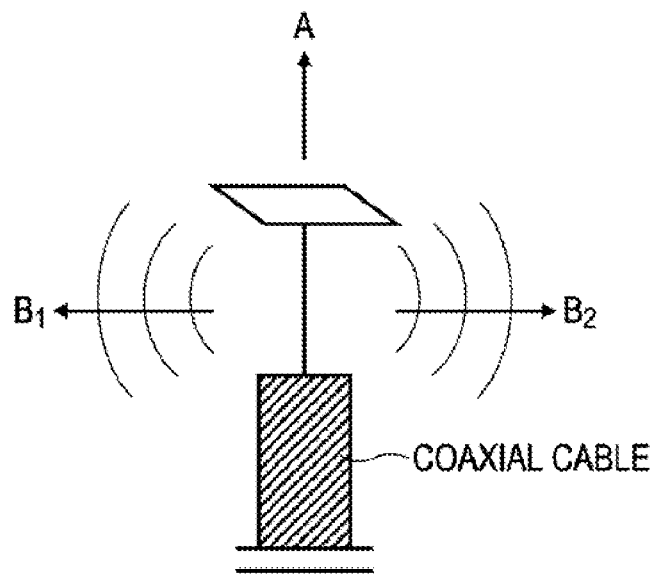
FIG. 17 schematically illustrates the structure of a "capacitance-loaded" antenna in which metal is attached to the tip of an antenna element, thereby inducing a capacitance and reducing the height of the antenna.

In the field of radio communication, "capacitance-loaded" antennas in which metal is attached to the tip of an antenna element, as illustrated in FIG. 17, thereby inducing a capacitance and reducing the height of the antenna, are widely known. At a glance, this type of antenna has a structure similar to that of the EFC antenna illustrated in FIG. 2, A description will be given of the differences between an EFC antenna used in a transmitter/receiver of the embodiment and a capacitance-loaded antenna.

A capacitance-loaded antenna illustrated in FIG. 17 emits radio waves in directions $B_1$ and $B_2$ around a radiant element of the antenna. However, the antenna emits no radio waves in direction A, which serves as a null point. Electric fields generated around the antenna are examined in detail. Specifically, a radiated electric field attenuated in inverse proportion to the distance from the antenna, an induced electric field attenuated in inverse proportion to the square of the distance from the antenna, and an electrostatic field attenuated in inverse proportion to the cube of the distance from the antenna are generated. Because the induced electric field and the electrostatic field are attenuated relative to the distance more rapidly than the radiated electric field, only the radiated electric field is discussed in general wireless systems, and the induced electric field and the electrostatic field are often neglected. Even in the case of the capacitance-loaded antenna illustrated in FIG. 17, an induced electric field and an electrostatic field are generated in direction A but are rapidly attenuated in air. Therefore, such an induced electric field and an electrostatic field are not actively employed in radio communication.

FIG. 8 illustrates an exemplary structure of an EFC antenna which can be applied to the communication system illustrated in FIG. 1. However, the structure of the EFC antenna is not limited thereto.

Figure 20:
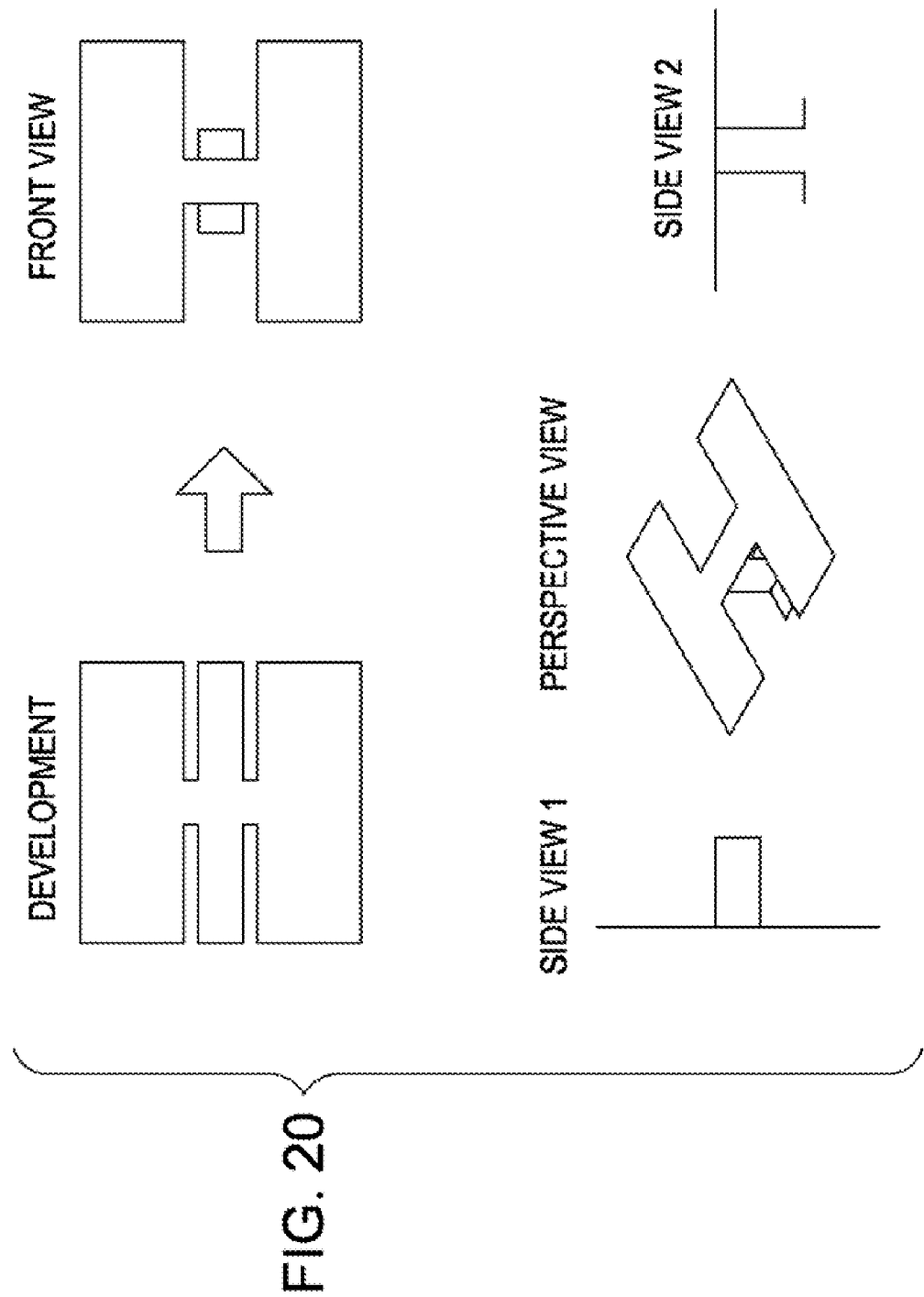
FIG. 20 illustrates an exemplary method of producing an electrode portion of an EFC antenna by performing sheet metal processing.
Figure 21:
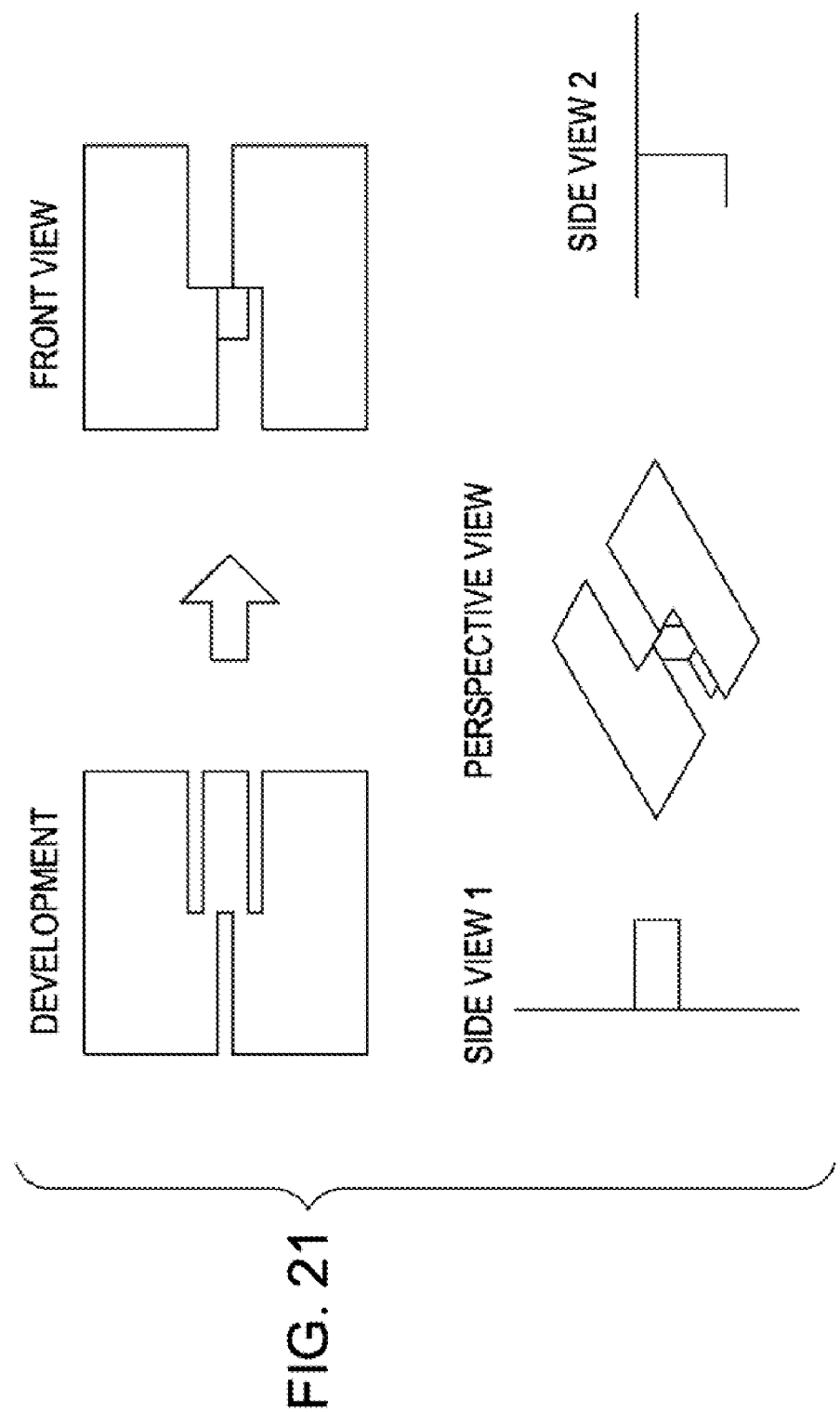
FIG. 21 illustrates another exemplary method of producing an electrode portion of an EFC antenna by performing sheet metal processing.
Figure 22:
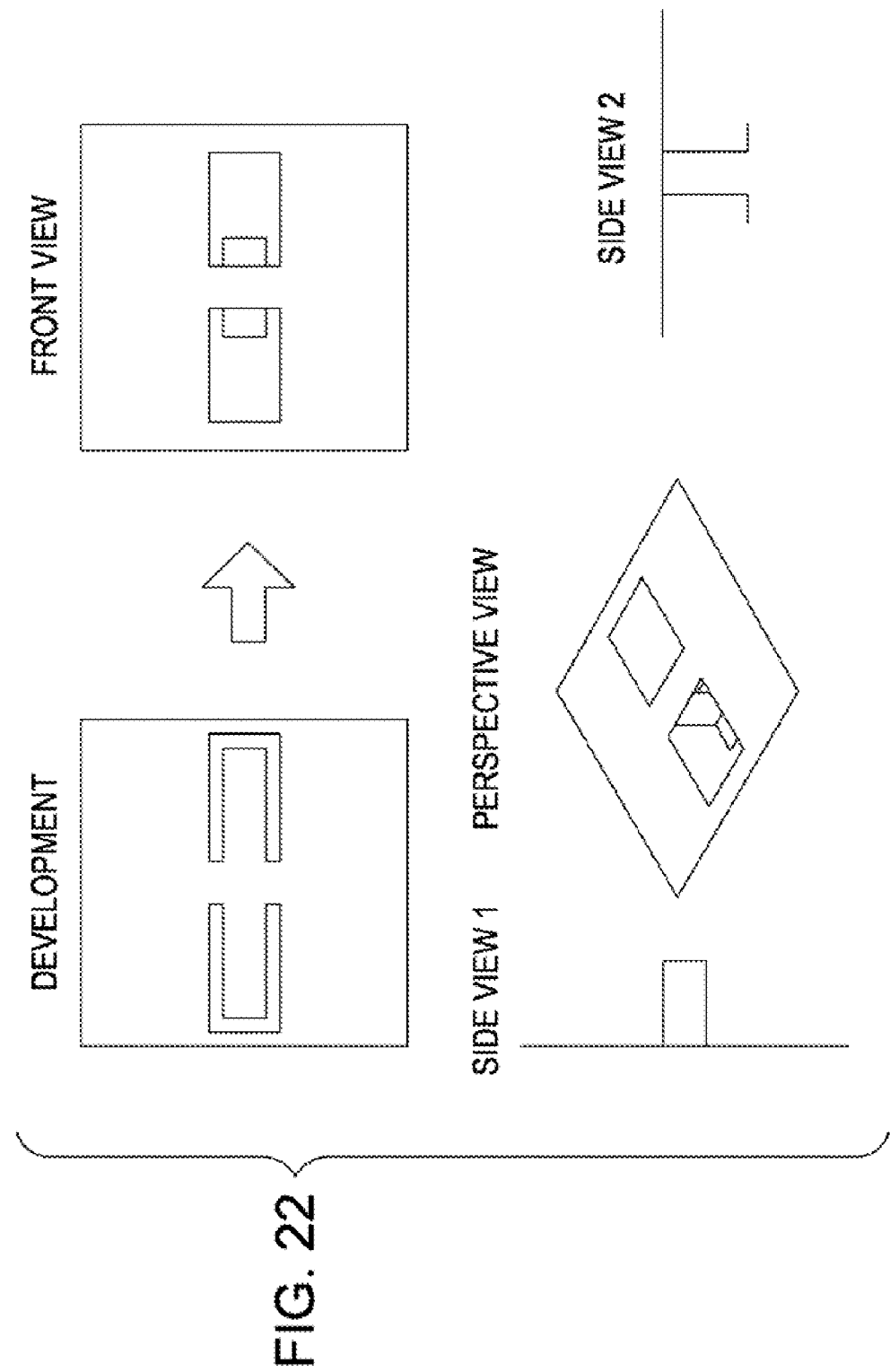
FIG. 22 illustrates another exemplary method of producing an electrode portion of an EFC antenna by performing sheet metal processing.

For example, an electrode portion of an EFC antenna can be easily produced at low cost by performing sheet metal processing. FIGS. 20 to 22 illustrate methods of producing the same.

Referring to these drawings, a sheet metal made of copper or the like is punched to form a portion which will become a coupling electrode and a portion which will become a leg connecting the coupling electrode to an RF signal line.

Next, the sheet metal is bent to allow the leg portion to be bent substantially perpendicular to the coupling electrode portion, whereby the leg portion achieves a desired height. The desired height mentioned here corresponds to the size that can play both the role of avoiding coupling between the coupling electrode portion and ground and the role of enabling the leg portion to serve as a series inductor.

The coupling electrode fabricated in this manner is fixed to a corresponding position on, for example, a printed circuit board using a jig or the like (not shown) and mounted in place by reflow soldering or the like.

The number of leg portions operating as series inductors may be two, as illustrated in FIGS. 20 and 22, or one, as illustrated in FIG. 21. Alternatively, three or more leg portions may be formed.

Figure 23:
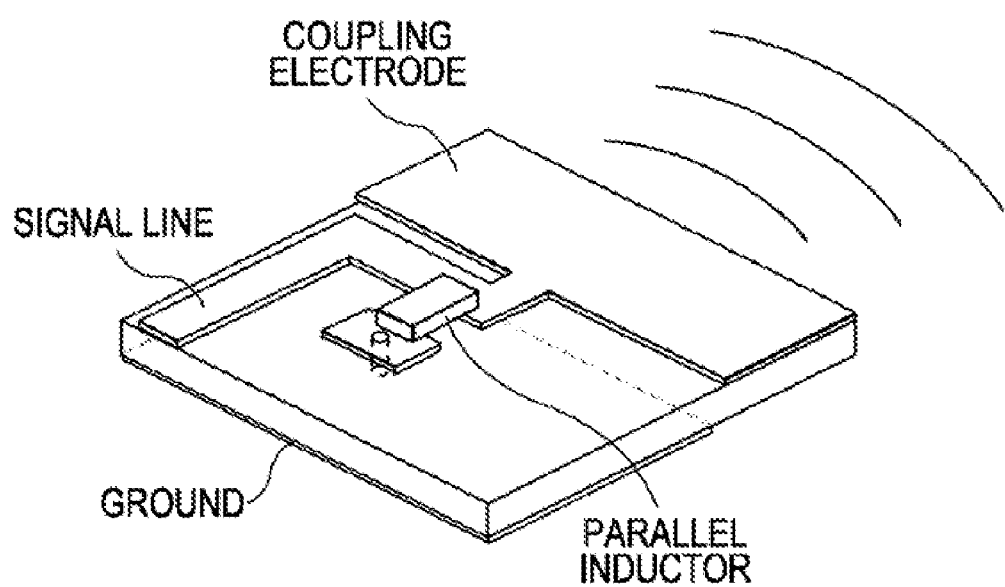
FIG. 23 illustrates an exemplary structure of an EFC antenna produced by forming a signal line, a resonating section, and a coupling electrode as a wiring pattern on one board.

Alternatively, an EFC antenna can be easily fabricated by forming a signal line, a resonating section, and a coupling electrode as a wiring pattern on one board. FIG. 23 illustrates an exemplary structure of such an EFC antenna. Note that no ground should be provided behind the coupling electrode. The EFC antenna illustrated is less advantageous than a three-dimensional EFC antenna in that the illustrated EFC antenna can only establish weaker coupling and its frequency band is narrow. However, the illustrated EFC antenna has advantages in terms of production cost and compact size (thinner in thickness).

As has been described above, in the communication system according to the embodiment, high-speed communication of a UWB signal can be implemented using the characteristics of an electrostatic field or an induced electric field. Since the strength of electrostatic coupling or induced-electric-field coupling greatly weakens in accordance with the communication distance, information can be prevented from being hacked by an unexpected communication partner, and confidentiality can be ensured. A user can intuitively select a communication partner by bringing the user's device physically closer to a desired communication partner with which the user wants to establish connection and exchanging information with the communication partner. Since no radio waves are emitted to the outside of the communication system according to the embodiment, the communication system does not interfere with other wireless systems. Since no external radio waves are received by the communication system, the communication system is not affected by external noise, and the reception sensitivity thereof is not deteriorated.

Figure 10:
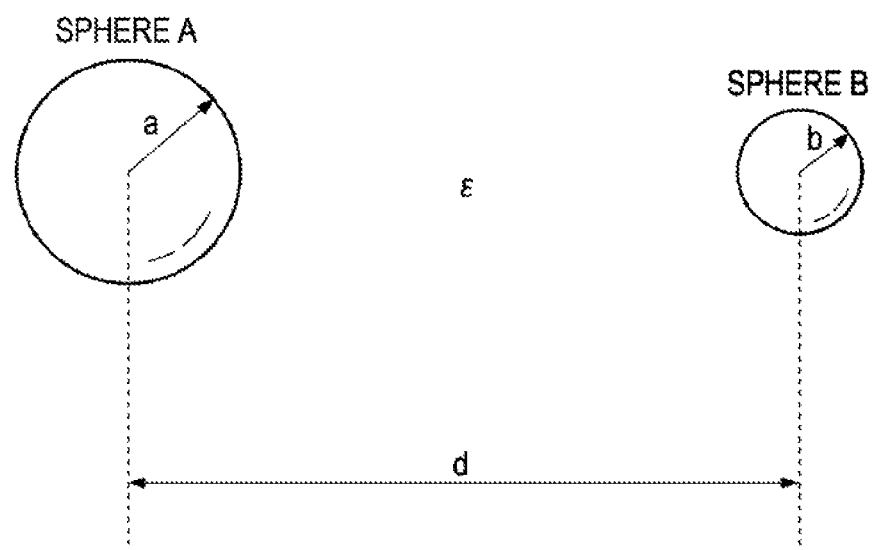
FIG. 10 illustrates an example in which electrodes of EFC antennas are shaped as spheres.

In the communication system, according to the embodiment, communication can be performed in the case where a capacitance is generated between two electrodes. Unlike a radiated electric field, an electrostatic field or an induced electric field has no polarization. Therefore, the shape of each electrode is not limited to a plate shape. For example, the electrodes can be spheres, as illustrated in FIG. 10, or can be freely designed in accordance with the design of wireless devices. In the illustrated example, two conductor spheres A and E with radius a [m] and radius b [m], respectively, are arranged at a distance d [m] in a medium with a dielectric constant ∈ [F/m] note that the distance d between the center of the two spheres should be sufficiently large compared with the radii a and b of the spheres A and B). A capacitance C between the two spheres is expressed as:

$$C = \frac{4\pi\varepsilon}{\left(\frac{1}{a}+\frac{1}{b}\right)}[F] \tag{4}$$

In the case of spherical electrodes, a stable electric-field coupling line can be realized without depending on the relative positional relationship between the electrodes facing each other. Since a metal plate can be disposed behind each electrode, the EFC antennas can be freely arranged in corresponding wireless devices without mounting limitations.

Figure 11:
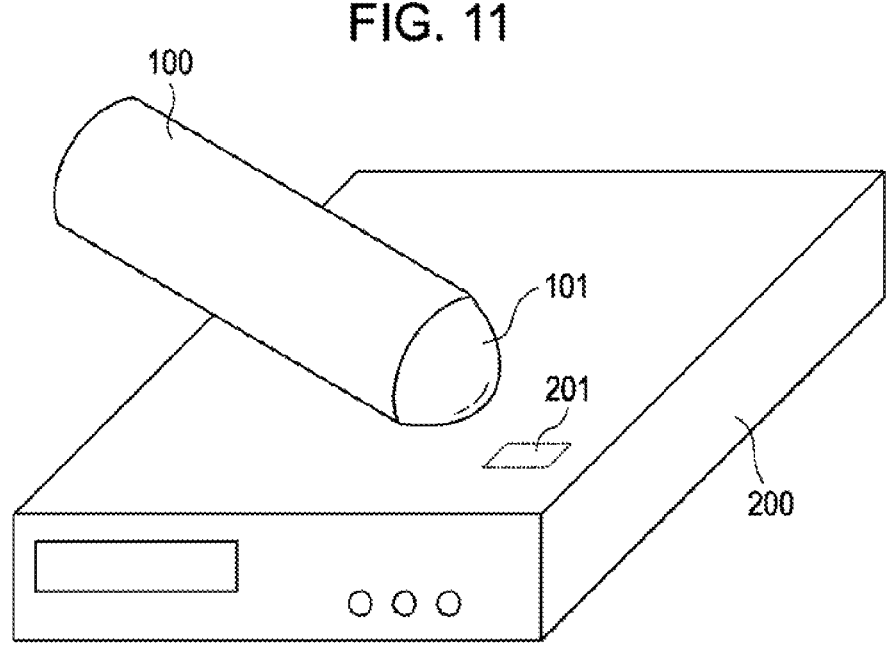
FIG. 11 illustrates an exemplary communication system using EFC antennas.

FIG. 11 depicts an exemplary structure of a communication system using EFC antennas. By bringing an electrode 101 of a portable wireless device 100 closer to an electrode 201 of a stationary wireless device 200, electric field coupling is established between the electrodes 101 and 201, and a communication operation starts. The portable wireless device 100 includes a pen-shaped casing, and the hemispherical electrode 101 is attached to the tip of the casing. Accordingly, a stable electric-field coupling line can be realized without depending on the relative positional relationship with the electrode 201 of the stationary wireless device 200, which faces the electrode 101.

By employing a wideband wireless communication scheme, such as UWB, in the illustrated very-short-distance communication system using electric-field coupling, data such as images or moving images can be downloaded or uploaded within a short period of time.

In another embodiment, this type of system can be combined with a contactless integrated circuit (IC) card. In this case, a system in which personal authentication or accounting is performed and content such as music or a moving image is downloaded, can be configured.

The foregoing description concerns the mechanism in which a signal is transmitted between a pair of EFC antennas in the communication system illustrated in FIG. 1. The transmission of a signal between two devices necessarily involves the transfer of energy. Therefore, this type of communication system can be applied to electric power transfer. As has been described above, the electric field $E_R$ generated by the EFC antenna of the transmitter propagates as a surface wave in air. The receiver side can reliably obtain power by rectifying and stabilizing a signal received by the EFC antenna.

Figure 24:
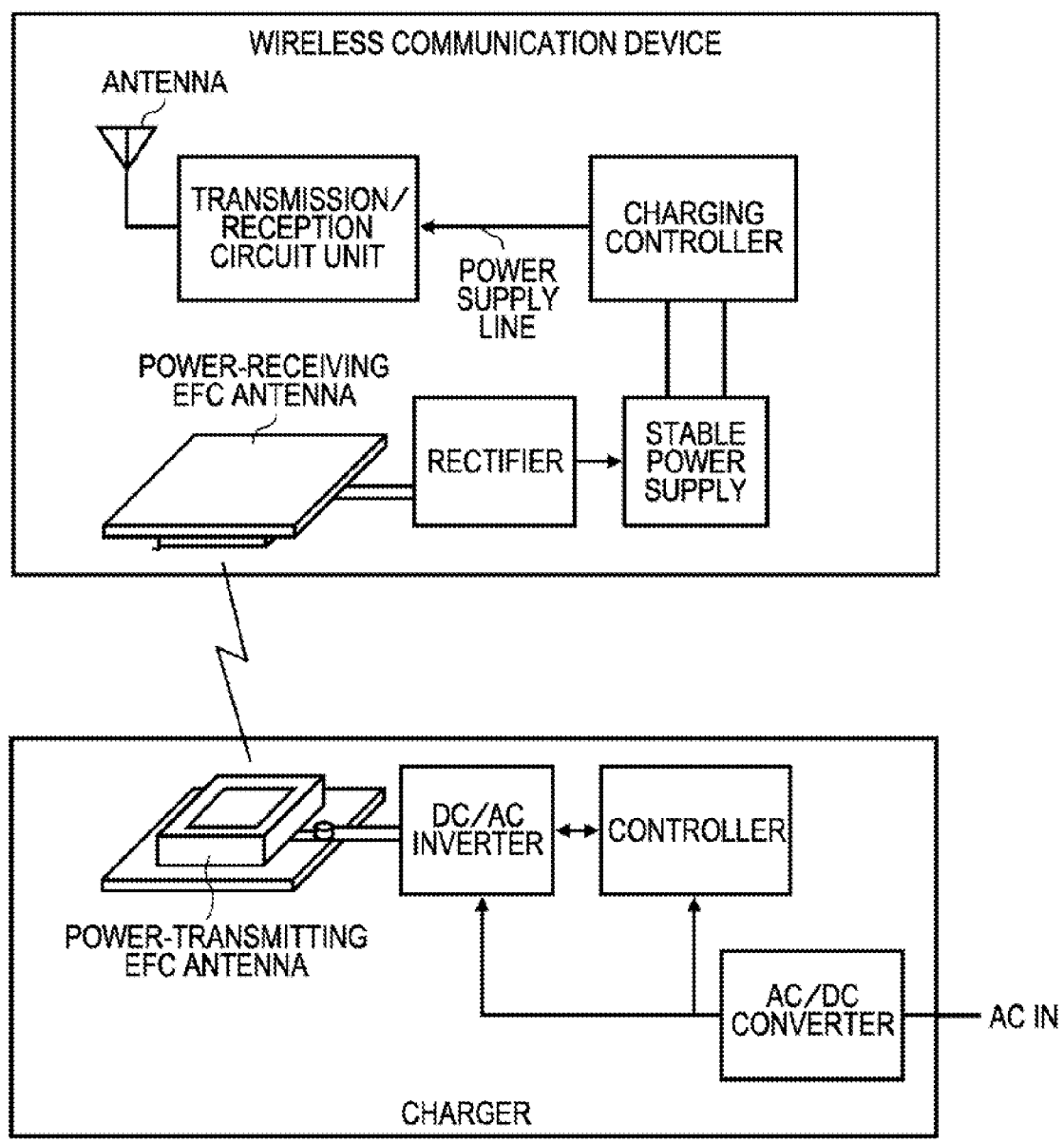
FIG. 24 is a diagram of an exemplary structure of the case where the communication system illustrated in FIG. 1 is applied to electric power transfer.

FIG. 24 illustrates an exemplary structure of the case where the communication system illustrated in FIG. 1 is applied, to electric power transfer.

In the illustrated system, by bringing a charger connected to an alternating current (AC) power supply and a wireless communication device closer to each other, power is transmitted in a contactless manner to the wireless communication device via internal EFC antennas contained in the charger and the wireless communication device, and hence the wireless communication device is charged with power. The EFC antennas are used only to transfer electric power.

In the case inhere no power-receiving EFC antenna is located near the power-transmitting EFC antenna, most of the power input to the power-transmitting EFC antenna is reflected back to a direct-current (DC)/AC inverter. Therefore, the emission of unnecessary radio waves to the outside and the consumption of power beyond necessity can be suppressed.

Although the example illustrated in the diagram concerns the case where the wireless communication device is charged with power, a device charged with power is not limited to a wireless device. For example, electric power can be transferred in a contactless manner to a music player or a digital camera.

Figure 25:
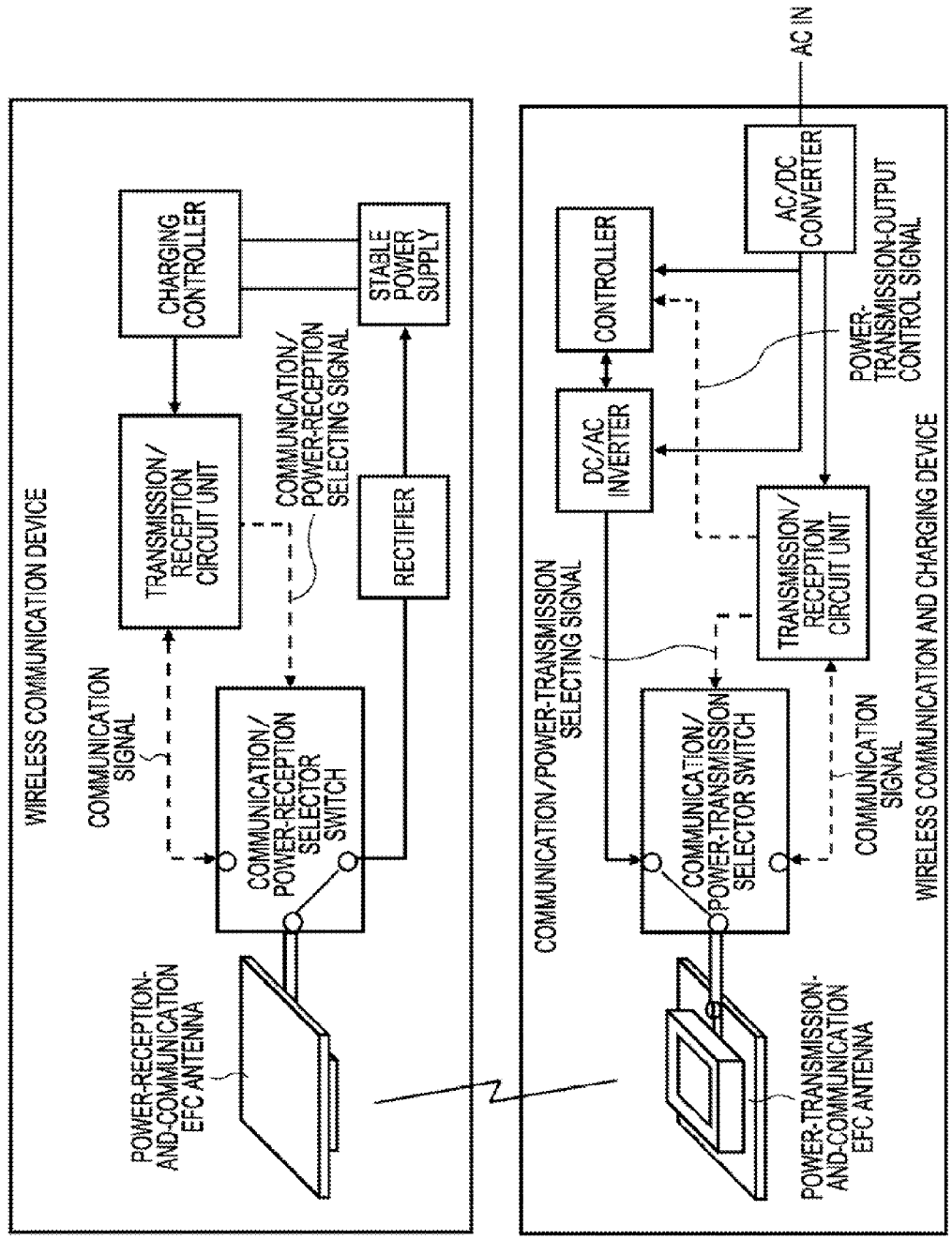
FIG. 25 is a diagram of another exemplary structure of the case where the communication system illustrated in FIG. 1 is applied to electric power transfer.

FIG. 25 illustrates another exemplary structure of the case where the communication system illustrated in FIG. 1 is applied to electric power transfer. In the illustrated system, the EFC antennas and the surface-wave transmission line are used to both transfer electric power and perform communication.

The timing to switch between communication and power transmission is controlled by a communication/power transmission-(reception)-switching signal sent from a transmission circuit unit. Alternatively, communication and power transmission can be alternately performed on a predetermined cycle. In this case, the power transmission output can be maintained at an optimum level by feeding back a charging status in addition to a communication signal to the charger. For example, when charging is completed, information indicating the completion is sent to the charger, thereby changing the power transmission output to zero.

Although the charger is connected to the AC power supply in the system illustrated in the drawings, the system may be applicable to the case where power is supplied from a cellular phone to another cellular phone with low battery power remaining therein.

The present invention has been described hereinabove in the context of specific embodiments thereof. It is to be understood, however, that modifications of or alternatives to the embodiments can be made by those skilled in the art without departing from the scope of the present invention.

In this specification, the embodiments applied to communication systems in which data, such as a UMB signal, is transmitted using electric-field coupling in a cableless manner have been mainly described. However, the scope of the present invention is not limited thereto. The present invention is similarly applicable to, for example, a communication system using an RF signal other than that in the UWB communication scheme or a communication system performing data transmission of a relatively low frequency signal using electric-field coupling.

In this specification, the embodiments applied to systems in which data is communicated between a pair of EFC antennas have been mainly described. Since the transmission of a signal between two devices necessarily involves the transfer of energy, this type of communication system can also be applied to electric power transfer.

In short, the present invention has been disclosed by way of examples, and the disclosure should not be construed as the restrictive one. Reference shall be made to the appended claims for delineation of the scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A communication system, comprising:
   a transmitter including a transmission circuit unit configured to generate a radio-frequency signal for transmitting data and an electric-field-coupling antenna configured to transmit the radio-frequency signal as an electrostatic field or an induced electric field;
   a receiver including an electric-field-coupling antenna and a reception circuit unit configured to receive and process the radio-frequency signal received by the electric-field-coupling antenna; and
   an impedance matching unit configured to make an impedance of the electric-field-coupling antenna of the transmitter equal to an impedance of the electric-field-coupling antenna of the receiver,
   wherein:
      the radio-frequency signal is transmitted by electric-field coupling between the electric-field-coupling antennas, facing each other, of the transmitter and the receiver; and
      the radio-frequency signal is transmitted by a longitudinal wave component of the electrostatic field or the induced electric field.

2. The communication system according to claim 1, wherein the radio-frequency signal is an ultra-wideband signal using an ultra-wideband.

3. The communication system according to claim 1, wherein the impedance matching unit serves as a band-pass filter with a desired radio-frequency band as a passband between the electric-field-coupling antennas of the transmitter and the receiver.

4. The communication system according to claim 1, wherein the electric-field-coupling antenna performs impedance conversion for reducing, relative to a characteristic impedance at an input side connecting to the transmission circuit unit, a characteristic impedance at an output side facing the other electric-field-coupling antenna.

5. The communication system according to claim 1, wherein:
   in the transmitter, a radio-frequency-signal transmission line for transmitting the radio-frequency signal generated by the transmission circuit unit is connected substantially to the center of an electrode of the electric-field-coupling antenna with the impedance matching unit interposed therebetween; and in the receiver, a radio-frequency-signal transmission line for transmitting the radio-frequency signal to the reception circuit unit is connected substantially to the center of an electrode of the electric-field-coupling antenna with the impedance matching unit interposed therebetween.

6. The communication system according to claim 5, wherein the impedance matching unit includes a conductor with a length dependent on an operating wavelength.

7. The communication system according to claim 5, wherein the impedance matching unit includes a lumped-constant circuit.

8. A communication apparatus, comprising:
a communication circuit unit configured to process a radio-frequency signal for transmitting data; and
an electric-field-coupling antenna configured to establish electric-field coupling to a communication partner facing the communication apparatus, wherein:
the electric-field-coupling antenna has an impedance matched to that of the communication partner with which electric-field coupling is established; and
the radio-frequency signal is transmitted by a longitudinal wave component of an electric field.

9. The communication apparatus according to claim 8, wherein the electric-field-coupling antenna includes an electrode, a series inductor, and a parallel inductor, all of which are connected to a radio-frequency-signal transmission line.

10. The communication apparatus according to claim 9, wherein the constants of the parallel and series inductors and the constant of a capacitance are determined so that the electric-field-coupling antenna, with a similar electric-field-coupling antenna of the communication partner facing the communication apparatus, serves as a band-pass filter having a desired radio-frequency band as a passband.

11. The communication apparatus according to claim 9, wherein the constant of the parallel inductor and the constant of a capacitance are determined so that the electric-field-coupling antenna serves as an impedance conversion circuit for reducing, relative to a characteristic impedance at an input side connected to the communication circuit unit, a characteristic impedance at an output side facing the communication partner.

12. The communication apparatus according to claim 9, wherein the electrode included in the electric-field-coupling antenna is mounted at a predetermined height above a printed circuit board on which the communication circuit unit is mounted.

13. The communication apparatus according to claim 12, wherein the predetermined height is a distance for suppressing electric-field coupling to ground on the printed circuit board, a distance for forming the series inductor for achieving impedance matching, and a distance for reducing emission of unnecessary radio waves due to current flow in the series inductor.

14. The communication apparatus according to claim 9, wherein the electrode is substantially hemispherical.

15. The communication apparatus according to claim 8, further comprising electric-power generating means for generating electric power by rectifying the radio-frequency signal transmitted between the electric-field-coupling antennas.

16. An electric-field-coupling antenna used in communicating a radio-frequency signal using electric-field coupling, comprising:
an electrode;
a series inductor; and
a parallel inductor, wherein:
the electrode, the series inductor, and the parallel inductor are connected to a radio-frequency-signal transmission line;
the electric-field-coupling antenna has an impedance matched to that of a communication partner with which electric-field coupling is established; and
the radio-frequency signal is transmitted by a longitudinal wave component of an electric field.

17. The electric-field-coupling antenna according to claim 16, wherein the radio-frequency-signal transmission line is connected substantially to the center of the electrode with the series inductor and the parallel inductor interposed therebetween.

18. The electric-field-coupling antenna according to claim 16, wherein each of the series inductor and the parallel inductor includes a conductor with a length dependent on an operating wavelength.

19. The electric-field-coupling antenna according to claim 16, wherein the constants of the parallel and series inductors and the constant of a capacitance are determined so that the electric-field-coupling antenna, with a similar electric-field-coupling antenna of the communication partner facing the electric-field-coupling antenna, serves as a band-pass filter having a desired radio-frequency band as a passband.

20. The electric-field-coupling antenna according to claim 16, wherein the constant of the parallel inductor and the constant of a capacitance are determined so that the electric-field-coupling antenna serves as an impedance conversion circuit for reducing, relative to a characteristic impedance at an input side to which the radio-frequency signal is input, a characteristic impedance at an output side establishing electric-field coupling to the communication partner.

21. The electric-field-coupling antenna according to claim 16, wherein the electrode is mounted at a predetermined height above a printed circuit board.

22. The electric-field-coupling antenna according to claim 21, wherein the predetermined height is a distance for suppressing electric-field coupling to ground on the printed circuit board, a distance for forming the series inductor for achieving impedance matching, and a distance for reducing emission of unnecessary radio waves due to current flow in the series inductor.

23. The electric-field-coupling antenna according to claim 16, wherein the electrode is substantially hemispherical.

24. A communication apparatus, comprising:
a communication circuit unit configured to process a radio-frequency signal for transmitting data; and
an electric-field-coupling antenna configured to establish electric-field coupling to a communication partner facing the communication apparatus, wherein:
the electric-field-coupling antenna has an impedance matched to that of the communication partner with which electric-field coupling is established;
the electric-field-coupling antenna includes an electrode, a series inductor, and a parallel inductor, all of which are connected to a radio-frequency-signal transmission line;
the electrode included in the electric-field-coupling antenna is mounted at a predetermined height above a printed circuit board on which the communication circuit unit is mounted; and
the predetermined height is a distance for suppressing electric-field coupling to ground on the printed circuit board, a distance for forming the series inductor for achieving impedance matching, and a distance for reducing emission of unnecessary radio waves due to current flow in the series inductor.

25. An electric-field-coupling antenna used in communicating a radio-frequency signal using electric-field coupling, comprising:

an electrode;

a series inductor; and a parallel inductor, wherein:

the electrode, the series inductor, and the parallel inductor are connected to a radio-frequency-signal transmission line, and;

the electric-field-coupling antenna has an impedance matched to that of a communication partner with which electric-field coupling is established;

the electrode is mounted at a predetermined height above a printed circuit board; and the predetermined height is a distance for suppressing electric-field coupling to ground on the printed circuit board, a distance for forming the series inductor for achieving impedance matching, and a distance for reducing emission of unnecessary radio waves due to current flow in the series inductor.

* * * * *